US012701176B2

(12) United States Patent
Moshayedi

(10) Patent No.: US 12,701,176 B2
(45) Date of Patent: Aug. 4, 2026

(54) SYSTEMS AND METHODS FOR VIRTUAL MODEM COMMUNICATIONS OVER INTERNET PROTOCOL

(71) Applicant: Granite Telecommunications, LLC, Quincy, MA (US)

(72) Inventor: Kevan Moshayedi, Irvine, CA (US)

(73) Assignee: Granite Telecommunications, LLC, Quincy, MA (US)

( * ) Notice: Subject to any disclaimer, the term of this patent is extended or adjusted under 35 U.S.C. 154(b) by 0 days.

(21) Appl. No.: 19/368,708

(22) Filed: Oct. 24, 2025

(65) Prior Publication Data

US 2026/0122150 A1 Apr. 30, 2026

Related U.S. Application Data

(60) Provisional application No. 63/711,385, filed on Oct. 24, 2024.

(51) Int. Cl.
*G06F 15/16* (2006.01)
*H04L 69/16* (2022.01)

(52) U.S. Cl.
CPC ................................... *H04L 69/16* (2013.01)

(58) Field of Classification Search
CPC ...................................................... H04L 69/16
USPC .......................................................... 709/230
See application file for complete search history.

(56) References Cited

U.S. PATENT DOCUMENTS

| | | | | |
|---|---|---|---|---|
| 10,986,555 B1 | 4/2021 | Moshayedi | | |
| 11,743,797 B1 | 8/2023 | Moshayedi | | |
| 2004/0223464 A1* | 11/2004 | Dye | .................... | H04L 12/1818 |
| | | | | 370/352 |
| 2009/0060155 A1* | 3/2009 | Chingon | ........... | H04M 3/42229 |
| | | | | 379/142.04 |
| 2011/0194692 A1* | 8/2011 | Carpenter | ................ | H04K 1/00 |
| | | | | 380/255 |
| 2014/0137177 A1* | 5/2014 | Rakib | ................ | H04N 7/17309 |
| | | | | 725/129 |
| 2025/0138938 A1* | 5/2025 | Bansal | ................ | H04L 63/0254 |

* cited by examiner

*Primary Examiner* — Alan S Chou
(74) *Attorney, Agent, or Firm* — Hamilton, Brook, Smith & Reynolds, P.C.

(57) ABSTRACT

Embodiments perform virtual modem communications over Internet Protocol (IP). One such embodiment includes a customer appliance and a virtual modem. The customer appliance is operably connected to a customer device. The virtual modem is in a data center and communicates with the customer appliance via a first network. The virtual modem is configured to intercept an IP communication via a second network. The IP communication is intended for the customer device. The virtual modem is further configured to transform the intercepted IP communication into digital data and transmit the digital data to the customer appliance via the first network. The customer appliance is configured to receive the digital data from the virtual modem via the first network and transmit the received digital data to the customer device as serial data.

19 Claims, 19 Drawing Sheets

SYSTEMS AND METHODS FOR VIRTUAL MODEM COMMUNICATIONS OVER INTERNET PROTOCOL

RELATED APPLICATION

This Application claims the benefit of U.S. Provisional Application No. 63/711,385, filed on Oct. 24, 2024. The entire teachings of the above Application are incorporated herein by reference.

BACKGROUND

The use of modems and Voice over Internet Protocol (VoIP) is ubiquitous and has become essential in many communication systems.

SUMMARY

While the use of modems and Voice over Internet Protocol (VoIP) is widespread, these technologies could benefit from improvements to both accuracy and reliability. Embodiments provide such functionality.

An example embodiment, which may be referred to herein as "Modem Protocol Relay" (MPR) improves modem connectivity by converting traditional audio modem signals from standards such as International Telecommunication Union Telecommunication Standardization Sector (ITU-T) V-Series V.21 through V.32 into structured digital packets for IP transport and serial (e.g., RS232) communication using serial over IP techniques. With digital signal processing, such an embodiment validates audible modem exchanges and reconstructs digital/serial data streams. Embodiments may handle transport, reassembly, and retransmission to keep modem communication sessions accurate and reliable. Further, embodiments may convert modem tones into structured packets for serial/IP transport, validate streams, and enable predictive analytics at the application layer.

Another example embodiment is directed to a system for virtual modem communications over Internet Protocol (IP). The system includes a customer appliance and a virtual modem. The customer appliance is operably connected to a customer device. The virtual modem is in a data center and communicates with the customer appliance via a first network. The virtual modem is configured to intercept an IP communication via a second network. The IP communication is intended for the customer device. The virtual modem is further configured to transform the intercepted IP communication into digital data and transmit the digital data to the customer appliance via the first network. The customer appliance is configured to receive the digital data from the virtual modem via the first network and transmit the received digital data to the customer device as serial data.

In an example embodiment, the intercepted IP communication may include audio data generated by a modem device. The second network may be a VoIP network or a hybrid VoIP and public switched telephone network.

According to an example embodiment, the customer appliance may be a first customer appliance. The intercepted IP communication may include serial data generated by a second customer appliance and the second network may be an IP network.

The intercepted IP communication may include serial data generated by a virtual communications interface and the second network may be an IP network.

In an example embodiment, the system may further include a remote management console. The remote management console may be configured to receive an identifier corresponding to the customer device. The remote management console may be further configured to establish an out-of-band-management (OOBM) connection to the customer device based on the received identifier. The remote management console may be further configured to receive at least one OOBM command for the customer device and transmit the at least one OOBM command received to the customer device. The intercepted IP communication may include the at least one OOBM command received. According to one such embodiment, the first network may be an IP network. The remote management console may include a remote terminal interface. The received identifier may include at least one of a network name or address of the customer device on the IP network. The OOBM connection may be a remote terminal protocol connection. In another such embodiment, the remote management console may include an online interface and the received identifier may be a selection of the customer device via the online interface. According to yet another such embodiment, the remote management console may be further configured to perform user authentication. The remote management console may be further configured to establish the OOBM connection, receive the at least one OOBM command, and transmit the at least one OOBM command responsive to an indication that the user authentication is successful. In one such embodiment, the remote management console may include a remote terminal interface. The received identifier may be a telephone number corresponding to the customer device and the OOBM connection may be a modem connection. According to another such embodiment, the first network may be an IP network. The remote management console may include a remote terminal interface and a transcoded communications interface. The received identifier may include at least one of a network name or address of the customer device on the IP network. The OOBM connection may be established via the transcoded communications interface and the OOBM connection may be a remote terminal protocol connection.

According to an example embodiment, the intercepted IP communication may include at least one of (i) analog data and (ii) metadata associated with a modem communication. The virtual modem may be further configured to execute a machine learning (ML) model. The ML model may be configured to identify at least one application-layer pattern based on at least one of the analog data and the metadata. The ML model may be further configured to determine a confidence score based on the at least one application-layer pattern identified where the confidence score may be associated with the modem communication. In one such embodiment, the ML model may be further configured to, based on the at least one application-layer pattern identified, generate at least one status evaluation corresponding to at least one phase of the modem communication. According to another such embodiment, the virtual modem may be further configured to, responsive to the confidence score being below a threshold, (1) perform one or more diagnostics of the modem communication and (2) generate a diagnostic report based on a result of the one or more diagnostics performed. In yet another such embodiment, the virtual modem may be further configured to, responsive to the confidence score being below a threshold, (1) based on at least one of the analog data and the metadata, generate reporting information for the modem communication and (2) store the generated reporting information in memory associated with the virtual modem. According to one such embodiment, the modem communication may be generated by a modem device operably connected to a remote device. The virtual modem may be further configured to, responsive to the confidence score being below a threshold, based on the at least one application-layer pattern identified, generate at least one recommendation. A given recommendation of the at least one recommendation may relate to at least one of (i) resolving an error associated with the modem device, (ii) resolving an error associated with the remote device, (iii) performing a maintenance operation on the modem device, and (iv) performing a maintenance operation on the remote device. In another such embodiment, the modem communication may be generated by a modem device operably connected to a remote device. The virtual modem may be further configured to, responsive to the confidence score being below a threshold, generate at least one user guidance item. A given user guidance item, of the at least one user guidance item, may relate to performing an evaluation of at least one of (i) the modem device and (ii) the remote device. According to yet another such embodiment, the modem communication may be generated by a modem device operably connected to a remote device. The virtual modem may be further configured to, responsive to the confidence score being below a threshold, determine at least one updated parameter value for at least one of the modem device and the remote device.

In an example embodiment, the virtual modem may be a first virtual modem. The customer device may include a modem device. The customer appliance may include a second virtual modem. The second virtual modem may be configured to (i) receive analog data from the modem device, (ii) transform the received analog data into serial data, and (iii) transmit the serial data to the first virtual modem via the first network.

Another example embodiment is directed to a system for virtual modem communications over IP. The system includes a first customer appliance and a second customer appliance. The first customer appliance is operably connected to a first customer device. The second customer appliance is operably connected to a second customer device. The first customer appliance is configured to receive first serial data from the first customer device. The first customer appliance is further configured to transform the first serial data into IP data. The first customer appliance is further configured to transmit the IP data to the second customer appliance via an IP network. The second customer appliance is configured to receive the transmitted IP data via the IP network. The second customer appliance is further configured to transform the received IP data into second serial data. The second customer appliance is further configured to transmit the second serial data to the second customer device.

Yet another example embodiment is directed to a system for virtual modem communications over IP. The system includes a first virtual modem and a second virtual modem. The first virtual modem is operably connected to a first customer device and the second virtual modem is operably connected to a second customer device. The first virtual modem is configured to receive a modem communication from the first customer device. The modem communication is intended for the second customer device and includes first analog data. The first virtual modem is further configured to transform the first analog data into IP data and transmit the IP data to the second virtual modem via an IP network. The second virtual modem is configured to receive the transmitted IP data via the IP network. The second virtual modem is further configured to transform the received IP data into second analog data and transmit the second analog data to the second customer device.

An example embodiment is directed to a computer-implemented method of virtual modem communications over IP. The method is configured to implement any embodiments or combination of embodiments described herein.

Another example embodiment is directed to a computer program product for virtual modem communications over IP. The computer program product includes a non-transitory computer-readable medium with computer code instructions stored thereon. The computer code instructions are configured, when executed by a processor, to cause an apparatus associated with the processor to implement any embodiments or combination of embodiments described herein.

It is noted that embodiments of the systems, method, and computer program product may be configured to implement any embodiments or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
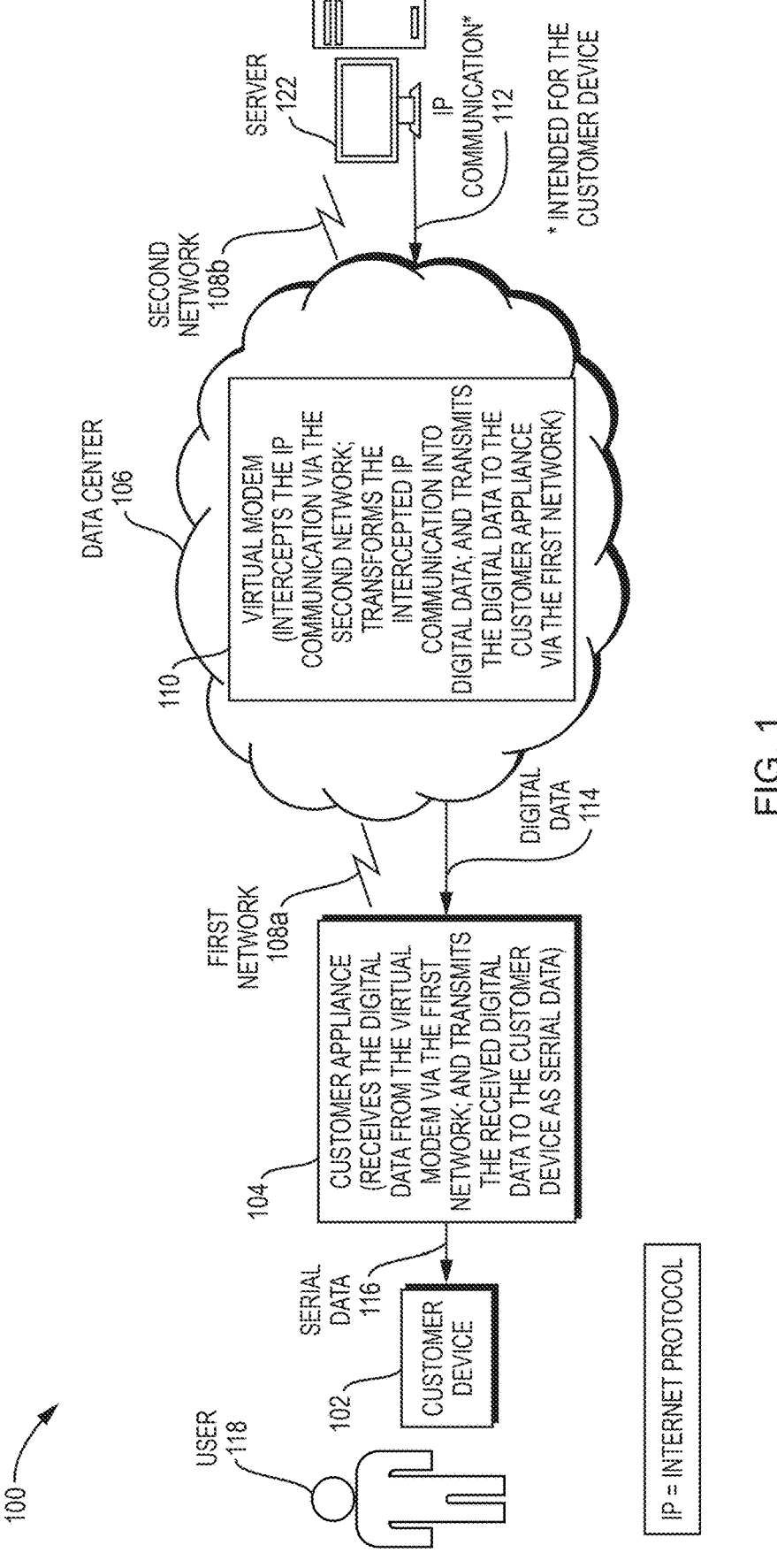
FIG. 1 is a block diagram of an example system for virtual modem communications over Internet Protocol (IP) according to an embodiment.

FIG. 1 is a block diagram of an example system 100 for virtual modem communications over Internet Protocol (IP) according to an embodiment, also referred to interchangeably herein as Modem Protocol Relay (MPR). The system 100 includes a customer appliance 104 and a virtual modem 110. The customer appliance 104 is operably connected to a customer device 102. The customer device 102 may be operated by a user, e.g., 118. The virtual modem 110 is in a data center 106 and communicates with the customer appliance 104 via a first network 108*a*. The virtual modem 110 is configured to intercept an IP communication 112 via a second network 108*b*. In an embodiment, the virtual modem 110 may intercept the IP communication 112 by employing a voice switch (not shown) in the data center 106 that identifies the IP communication 112 as including modem communications and routes the IP communication 112 to the virtual modem 110. According to another embodiment, intercepting the IP communication 112 may include performing tone detection, e.g., in a session border controller (SBC), or by a tone detection agent in the data center 106. Continuing with FIG. 1, the IP communication 112 may correspond to a data communication (not shown) from a server 122 and is intended for the customer device 102. The virtual modem 110 is further configured to transform the intercepted IP communication 112 into digital data 114. The virtual modem 110 is further configured to transmit the digital data 114 to the customer appliance 104 via the first network 108*a*. The customer appliance 104 is configured to receive the digital data 114 from the virtual modem 110 via the first network 108*a*. The customer appliance 104 is further configured to transmit the received digital data 114 to the customer device 102 as serial data 116.

In an example embodiment of the system 100, the intercepted IP communication 112 may include audio data (not shown) generated by a modem device (e.g., 424 (FIG. 4), 824*a* (FIG. 8), 824*b* (FIG. 8), 924*a* (FIG. 9), or 924*b* (FIG. 9)). The second network 108*b* may be a Voice over IP (VoIP) network or a hybrid VoIP and TDM/public switched telephone network (e.g., 440 (FIG. 4), 540 (FIG. 5), 640 (FIG. 6), 740 (FIG. 7), 840 (FIG. 8), or 940 (FIG. 9)).

According to an example embodiment of the system 100, the customer appliance 104 may be a first customer appliance (e.g., 504*a* (FIG. 5) or 704*a* (FIG. 7)). The intercepted IP communication 112 may include serial data (not shown) generated by a second customer appliance (e.g., 504*b* (FIG. 5) or 704*b* (FIG. 7)). The second network 108*b* may be an IP network (not shown).

Figure 12:
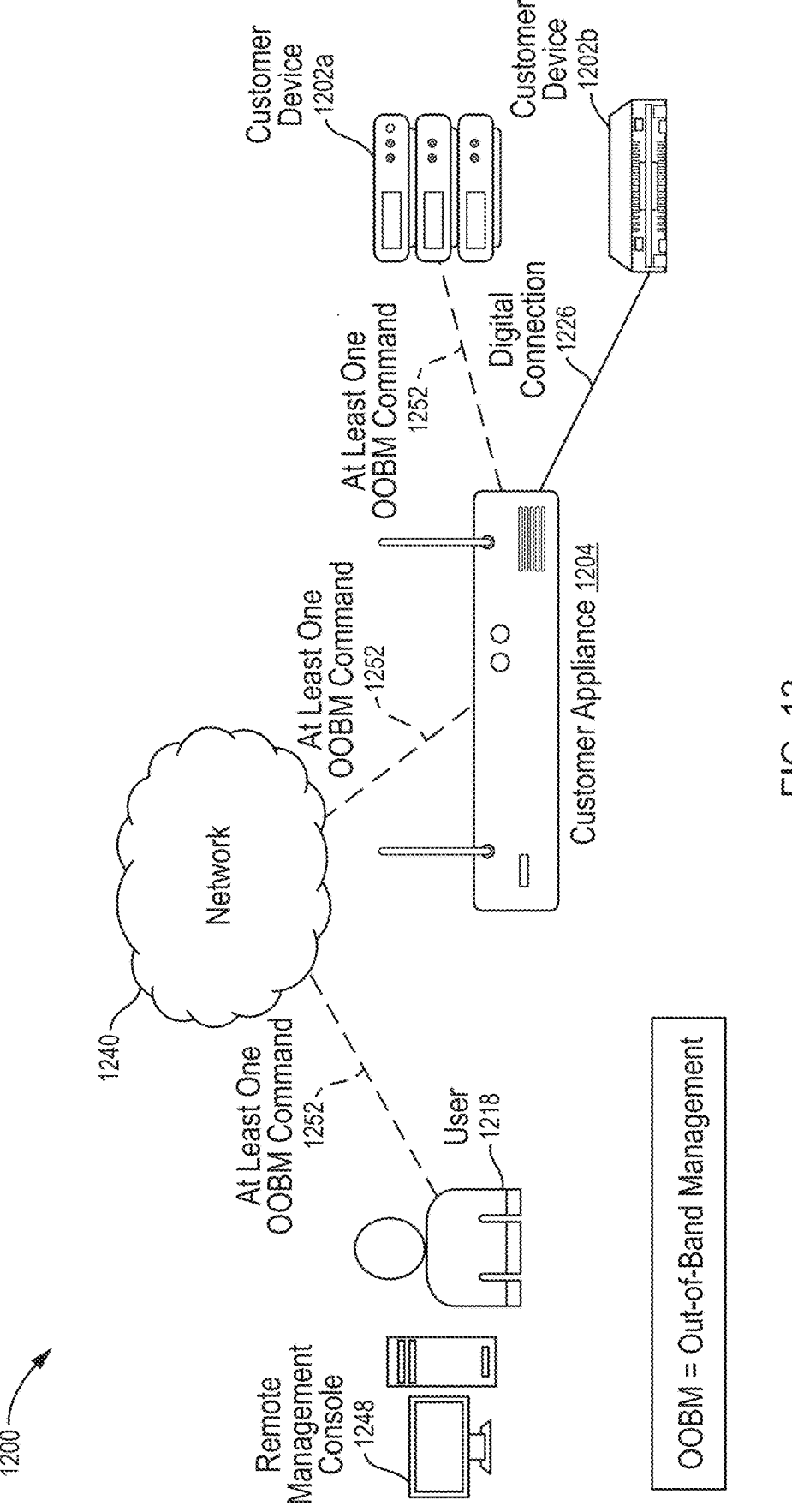
FIG. 12 is a block diagram of an example system for out-of-band management (OOBM) according to an embodiment.

In an example embodiment, the system 100 may further include a remote management console (e.g., 1248 (FIG. 12)). The remote management console may be configured to receive an identifier corresponding to the customer device 102. The remote management console may be further configured to establish an out-of-band-management (OOBM) connection (not shown) to the customer device 102 based on the received identifier. The remote management console may be further configured to receive at least one OOBM command (e.g., 1252 (FIG. 12)) for the customer device 102. The remote management console may be further configured to transmit the at least one OOBM command received to the customer device 102. The intercepted IP communication 112 may include the at least one OOBM command received. According to one such embodiment, the first network 108*a* may be an IP network (not shown). The remote management console may include a remote terminal interface (e.g., 1356 (FIG. 13), 1456 (FIG. 14), 1556 (FIG. 15), or 1656 (FIG. 16)). The received identifier may include at least one of a network name or address (e.g., 1366 (FIG. 13) or 1666 (FIG. 16)) of the customer device 102 on the IP network. The OOBM connection may be a remote terminal protocol connection (not shown). In another such embodiment, the remote management console may include an online interface (e.g., 1458 (FIG. 14)). The received identifier may be a selection (e.g., 1462 (FIG. 14)) of the customer device 102 via the online interface. According to yet another such embodiment, the remote management console may be further configured to perform user authentication, e.g., of user 1218 (FIG. 12). The remote management console may be further configured to establish the OOBM connection, receive the at least one OOBM command, and transmit the at least one OOBM command responsive to an indication that the user authentication is successful. In one such embodiment, the remote management console may include a remote terminal interface (e.g., 1356 (FIG. 13), 1456 (FIG. 14), 1556 (FIG. 15), or 1656 (FIG. 16)). The received identifier may be a telephone number (e.g., 1568 (FIG. 15)) corresponding to the customer device 102. The OOBM connection may be a modem connection (not shown). According to another such embodiment, the first network 108*a* may be an IP network (not shown). The remote management console may include a remote terminal interface (e.g., 1356 (FIG. 13), 1456 (FIG. 14), 1556 (FIG. 15), or 1656 (FIG. 16)) and a transcoded communications interface (e.g., 1674 (FIG. 16)). The received identifier may include at least one of a network name or address (e.g., 1366 (FIG. 13) or 1666 (FIG. 16)) of the customer device 102 on the IP network. The OOBM connection may be established via the transcoded communications interface. The OOBM connection may be a remote terminal protocol connection (not shown).

According to an example embodiment, the intercepted IP communication 112 may include at least one of analog data (not shown) and metadata (not shown) associated with a modem communication (not shown). The virtual modem 110 may be further configured to execute a machine learning (ML) model (not shown). The ML model may be configured to identify at least one application-layer pattern (not shown) based on at least one of the analog data and the metadata. The ML model may be further configured to determine a confidence score (not shown) based on the at least one application-layer pattern identified. The confidence score may be associated with the modem communication. In one such embodiment, the ML model may be further configured to, based on the at least one application-layer pattern identified, generate at least one status evaluation (not shown) corresponding to at least one phase (not shown) of the modem communication. According to another such embodiment, the virtual modem may be further configured to, responsive to the confidence score being below a threshold, (1) perform one or more diagnostics (not shown) of the modem communication and (2) generate a diagnostic report (not shown) based on a result of the one or more diagnostics performed. In yet another such embodiment, the virtual modem may be further configured to, responsive to the confidence score being below a threshold, (1) based on at least one of the analog data and the metadata, generate reporting information (not shown) for the modem communication and (2) store the generated reporting information in memory (e.g., 90 (FIG. 19) or 95 (FIG. 19)) associated with the virtual modem 110. According to one such embodiment, the modem communication may be generated by a modem device (e.g., 424 (FIG. 4), 824*a* (FIG. 8), 824*b* (FIG. 8), 924a (FIG. 9), or 924b (FIG. 9)) operably connected to a remote device (e.g., 402b (FIG. 4), 802b (FIG. 8), or 1102b (FIG. 11)). The virtual modem 110 may be further configured to, responsive to the confidence score being below a threshold, based on the at least one application-layer pattern identified, generate at least one recommendation (not shown). A given recommendation of the at least one recommendation may relate to at least one of resolving an error (not shown) associated with the modem device, resolving an error (not shown) associated with the remote device, performing a maintenance operation (not shown) on the modem device, and performing a maintenance operation (not shown) on the remote device. In another such embodiment, the modem communication may be generated by a modem device (e.g., 424 (FIG. 4), 824a (FIG. 8), 824b (FIG. 8), 924a (FIG. 9), or 924b (FIG. 9)) operably connected to a remote device (e.g., 402b (FIG. 4), 802b (FIG. 8), or 1102b (FIG. 11)). The virtual modem 110 may be further configured to, responsive to the confidence score being below a threshold, generate at least one user guidance item (not shown). A given user guidance item of the at least one user guidance item may relate to performing an evaluation (not shown) of at least one of the modem device and the remote device. According to yet another such embodiment, the modem communication may be generated by a modem device (e.g., 424 (FIG. 4), 824a (FIG. 8), 824b (FIG. 8), 924a (FIG. 9), or 924b (FIG. 9)) operably connected to a remote device (e.g., 402b (FIG. 4), 802b (FIG. 8), or 1102b (FIG. 11)). The virtual modem 110 may be further configured to, responsive to the confidence score being below a threshold, determine at least one updated parameter value (not shown) for at least one of the modem device and the remote device.

In an example embodiment, the virtual modem 110 may be a first virtual modem (e.g., 810a (FIG. 8)). The customer device 102 may include a modem device (e.g., 824a (FIG. 8)). The customer appliance 104 may include a second virtual modem (e.g., 810b (FIG. 8)). The second virtual modem may be configured to receive analog data (not shown) from the modem device. The second virtual modem may be further configured to transform the received analog data into serial data (not shown). The second virtual modem may be further configured to transmit the serial data to the first virtual modem via the first network 108a.

Existing Modem Over IP Communication Challenges

Figure 2:
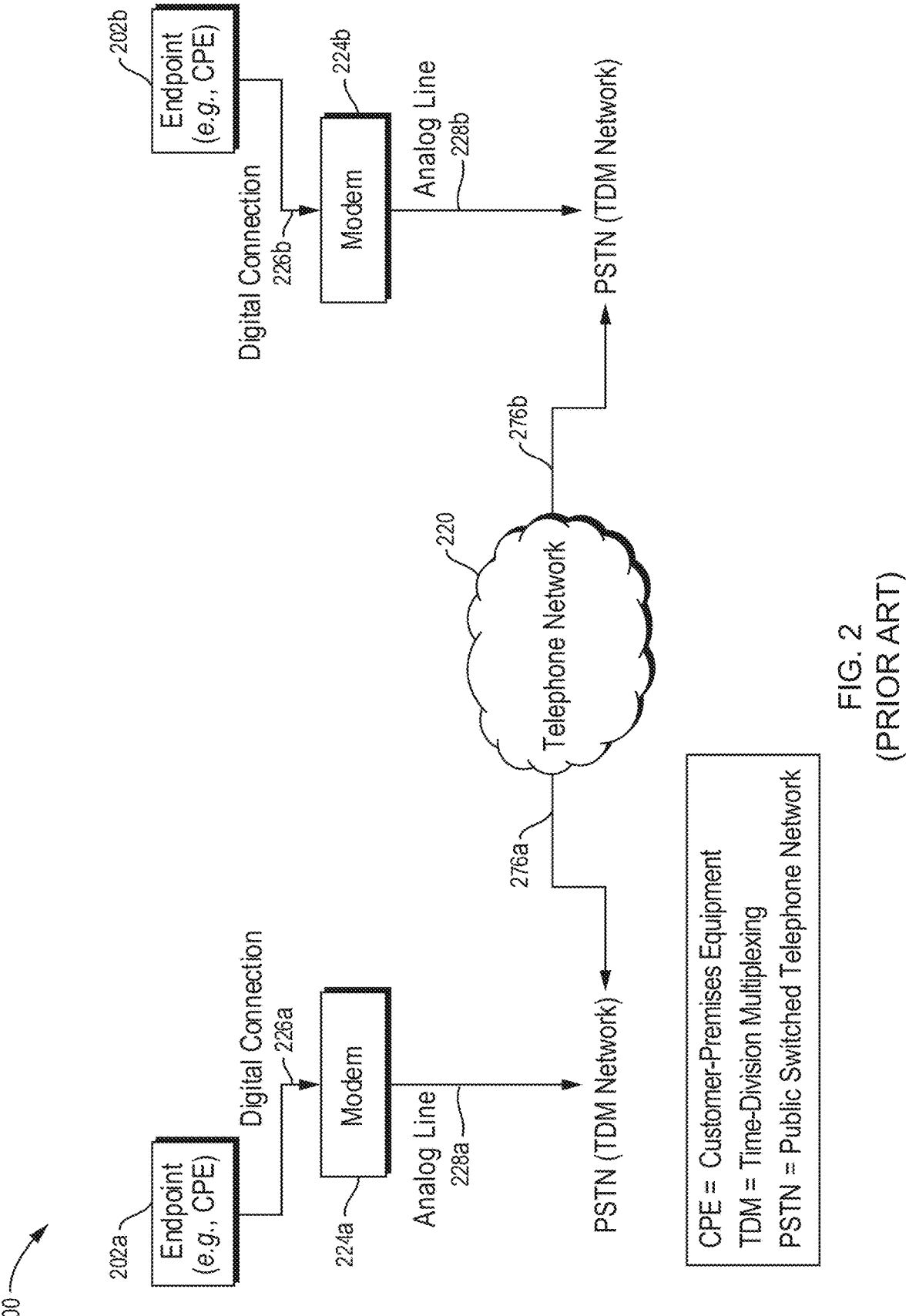
FIG. 2 is a block diagram of an example system for modem communications according to existing approaches.

FIG. 2 is a block diagram of an example system 200 for modem communications according to existing approaches. As shown in FIG. 2, modems 224a and 224b are at each end of a connection 276a-276b over a telephone network 220, which may be a public switched telephone network (PSTN) and/or TDM network. The modems 224a and 224b have digital connections 226a and 226b to endpoint devices 202a and 202b, respectively. The endpoints 202a and 202b may be customer-premises equipment (CPEs) such as RS232 devices. The connections 226a and 226b may be serial connections such as RS232 connections. The modems 224a and 224b may provide a dial tone to the endpoints 202a and 202b, respectively, and/or may convert between, e.g., audio and digital TDM. In a traditional setting like that of FIG. 2, plain old telephone service (POTS) lines 228a and 228b may use TDM-based communications.

Figure 3:
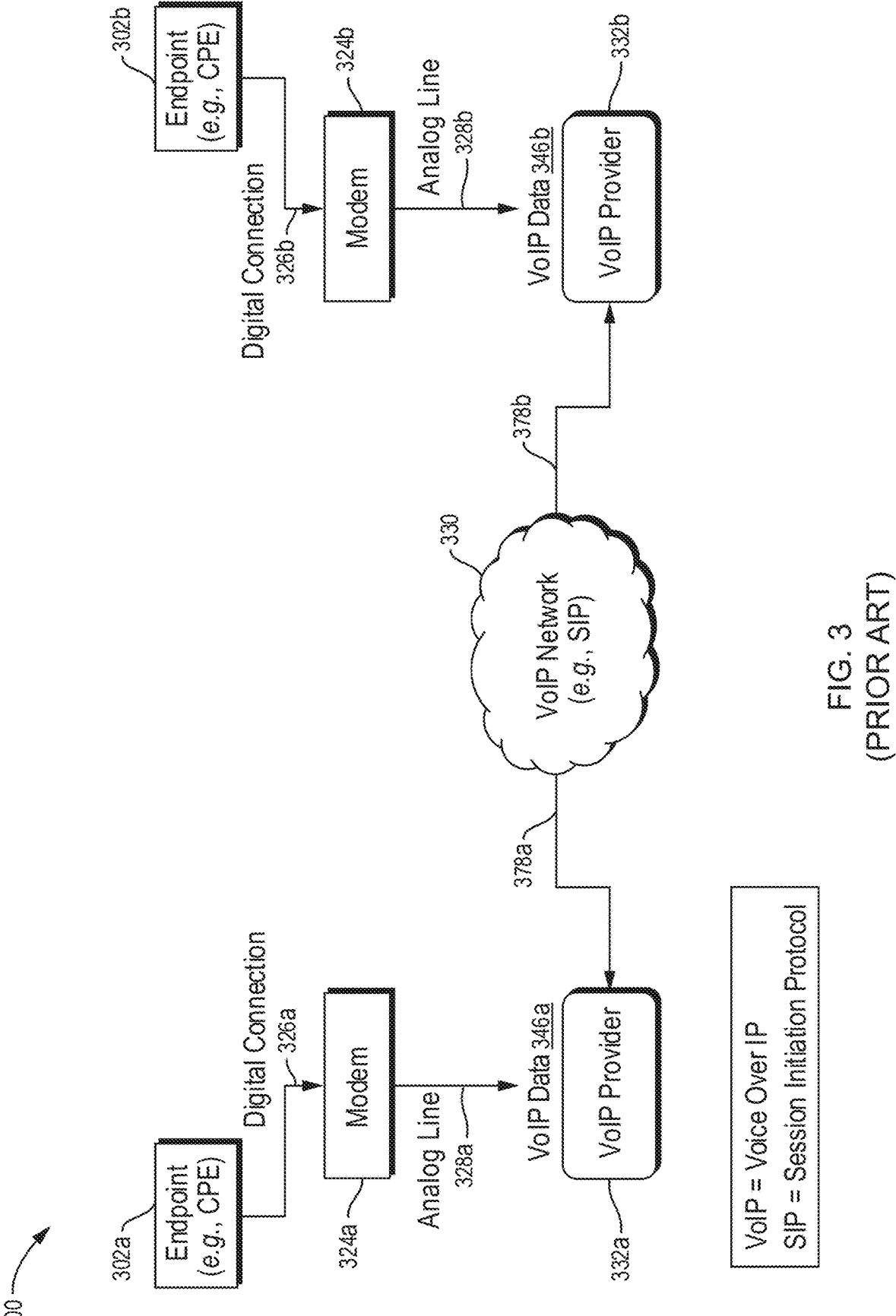
FIG. 3 is a block diagram of an example system for modem communications over IP according to existing approaches.

FIG. 3 is a block diagram of an example system 300 for modem communications over IP according to existing approaches. As shown in FIG. 3, modems 324a and 324b are at each end of a connection 378a-378b over a VoIP network 330, which may employ Session Initiation Protocol (SIP) and/or which may be an IP network. The modems 324a and 324b have digital connections 326a and 326b to endpoint devices 302a and 302b, respectively. The endpoints 302a and 302b may be CPEs such as RS232 devices. The connections 326a and 326b may be serial connections such as RS232 connections. The modems 324a and 324b may provide a dial tone to the endpoints 302a and 302b, respectively, and/or may convert between, e.g., audio and digital VoIP. The modems 324a and 324b connect via analog lines 328a and 328b, respectively, to VoIP providers 332a and 332b. In turn, the VoIP providers 332a and 332b may facilitate the connections 378a and 378b for the modems 324a and 324b, respectively, and/or may receive and transmit VoIP data 346a and 346b with the modems 324a and 324b, respectively.

Continuing with FIG. 3, TDM (such as in FIG. 2) is replaced by VoIP and/or SIP. The conventional approach of the system 300 is ineffective and/or unusable due to issues such as IP latency and jitter. Speeds over 2400 bits per second (bps) are also difficult to achieve in the system 300. For instance, communications in the system 300 may be limited when using a 2400 baud modem with VoIP over a wireless connection (not shown) such as long-term evolution (LTE), where 2400 baud corresponds to a transmission of 240 characters per second.

In the current landscape of telecommunications, there is a notable challenge when converting traditional analog lines, previously used for modem communications, from time-division multiplexing (TDM)-based technology to VoIP. This challenge arises due to how VoIP technology packages and transmits audio data, particularly modem communications, over IP networks.

With reference to FIG. 3, an example of a traditional process for modem communications using a VoIP connection may be as follows:

a) A sender, e.g., 324a, transmits an analog audio signal.

b) At a local endpoint, e.g., 332a, the analog audio signal is converted into digital packets, e.g., 346a, using, e.g., SIP and/or the G.711 codec.

c) The digital packets are transmitted over an IP network, e.g., 330.

d) The digital packets are received at a remote endpoint, e.g., 332b, where the digital packets are repackaged and reassembled back into audio packets.

e) The audio packets are retransmitted to their destination, e.g., 324b.

When dealing with regular voice communication, an existing VoIP connection process is relatively seamless and tolerable, even with occasional packet loss or jitter. However, modem communications using VoIP present unique challenges. Modems use frequency-shift keying (FSK) techniques, where specific frequencies represent data. Thus, even minor disruptions in the transmission process can result in failure of a modem connection. Any packet loss, jitter, or latency during transmission can confuse a receiving modem, causing a connection to drop.

The above phenomenon is especially problematic at higher modem speeds, such as 9600 baud or above. Lower speeds, like 300, 1200, or 2400 baud, are also challenging over IP/VoIP, but with higher modem speeds, the transmission becomes even more sensitive.

Example Innovative Modem Over IP Techniques

An example embodiment solves problems with existing approaches for modem communications over IP by changing the topology and process for how modem calls are handled, e.g., for inbound transmissions. With conventional approaches, a modem call may include several example steps as follows:

a) A modem dials a phone number.

b) Audio generated by the modem is converted to TDM data and enters a PSTN.

c) The audio is converted to IP data, repackaged at a receiving end, and transmitted back as audio packets to establish a modem connection.

Unlike existing approaches, in an embodiment, a modem call may be intercepted earlier in the transmission process to minimize the risk that, e.g., latency and/or jitter, affects the modem communication.

Example System Embodiments

Figure 4:
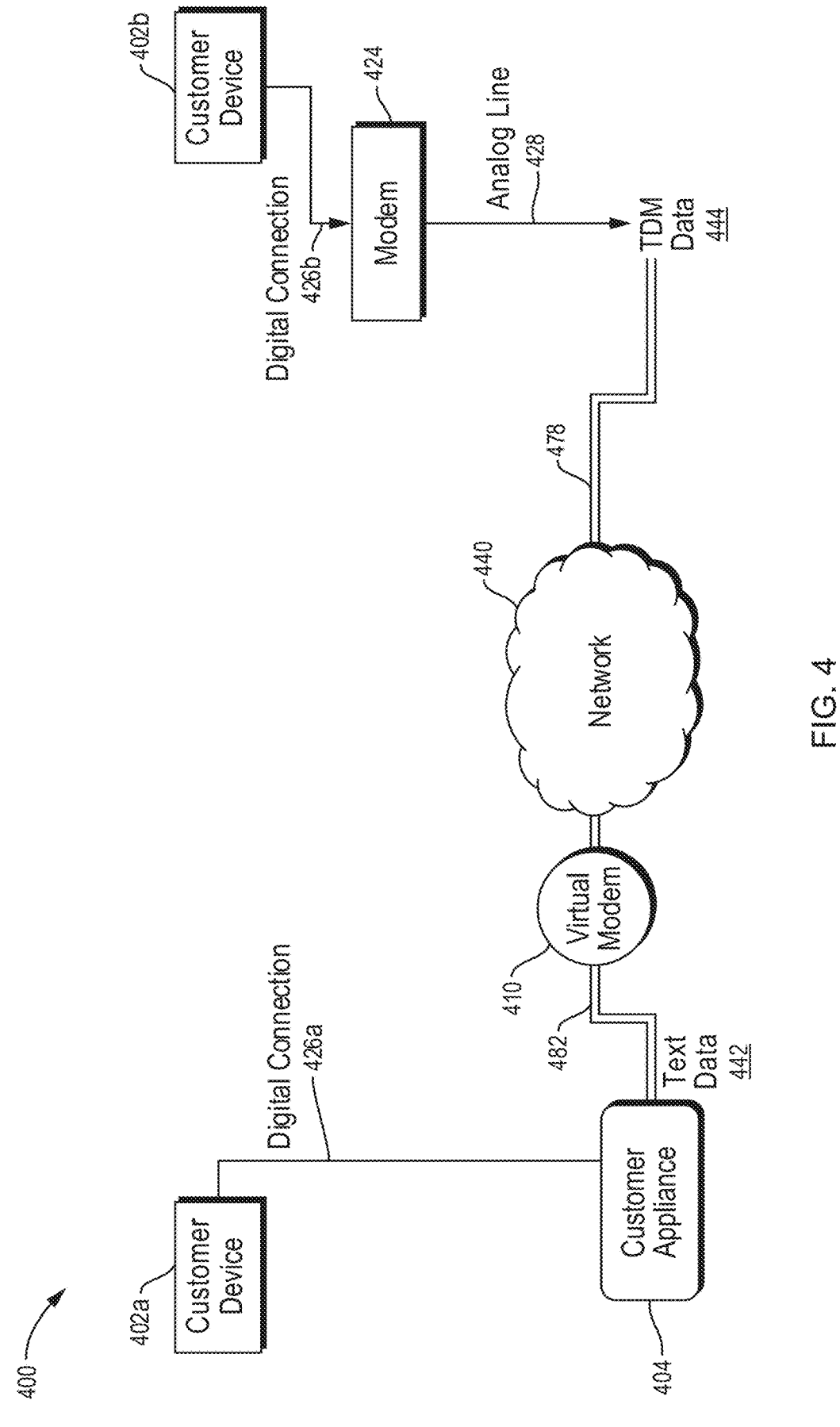
FIGS. 4-9 are block diagrams of example systems according to embodiments.

FIG. 4 is a block diagram of an example system 400 according to an embodiment. In an embodiment, FIG. 4 illustrates an example of modem communications over IP using SIP or hybrid SIP and TDM. As shown in FIG. 4, the system 400 includes customer devices 402*a* and 402*b*, which may be, e.g., CPEs or RS232 endpoints, etc. The devices 402*a* and 402*b* have digital connections 426*a* and 426*b* to customer appliance 404 and modem 424, respectively. The connections 426*a* and 426*b* may be serial connections such as DB9/DE9, RS232, or Universal Serial Bus (USB) connections. In an embodiment, the appliance 404 may be, e.g., an EPIK® Edge device from Applicant-Assignee Granite Telecommunications, LLC (Quincy, MA). The modem 424 may provide a dial tone to the device 402*b* and/or convert between audio and digital data. In addition, the modem 424 may connect to network 440 via analog line 428 and/or transmit and receive TDM data 444. The network 440 may be a VoIP network or a hybrid VoIP and TDM/public switched telephone network. A virtual modem 410 may intercept communications (not shown) via the network 440 and transform the intercepted communications into, e.g., text data 442, for transmission to the appliance 404.

Continuing with FIG. 4, in an embodiment, a portion of connection 478 may be configured to use TDM and the traditional modem 424 without converting to, e.g., SIP. According to one such embodiment, a dial-in connection originating from the foregoing configuration may be converted to SIP while transiting the network 440. Converting to SIP may introduce unwanted latency and/or jitter. Thus, to minimize latency, in an embodiment, an initial or earliest entry point may be located where latency is not introduced or exacerbated. According to one such embodiment, a suitable location may be provided by loading or implementing a virtual modem controller, e.g., 410, in a datacenter controller (not shown) that converts modem audio tones (not shown) into digital format, e.g., the text data 442. The virtual modem controller 410 may take audio tones in a datacenter and convert the tones to digital data. As shown in FIG. 4, a portion of connection 482 replaces a traditional modem with a direct connection between the device 402*a* and the appliance 404, the latter of which may provide RS232 and/or other suitable known serial connectivity. In an embodiment, one version of a virtual modem, e.g., a virtual modem controller, may execute at a datacenter controller and another version of a virtual modem, e.g., a virtual modem module, may execute in the appliance 404.

Figure 5:
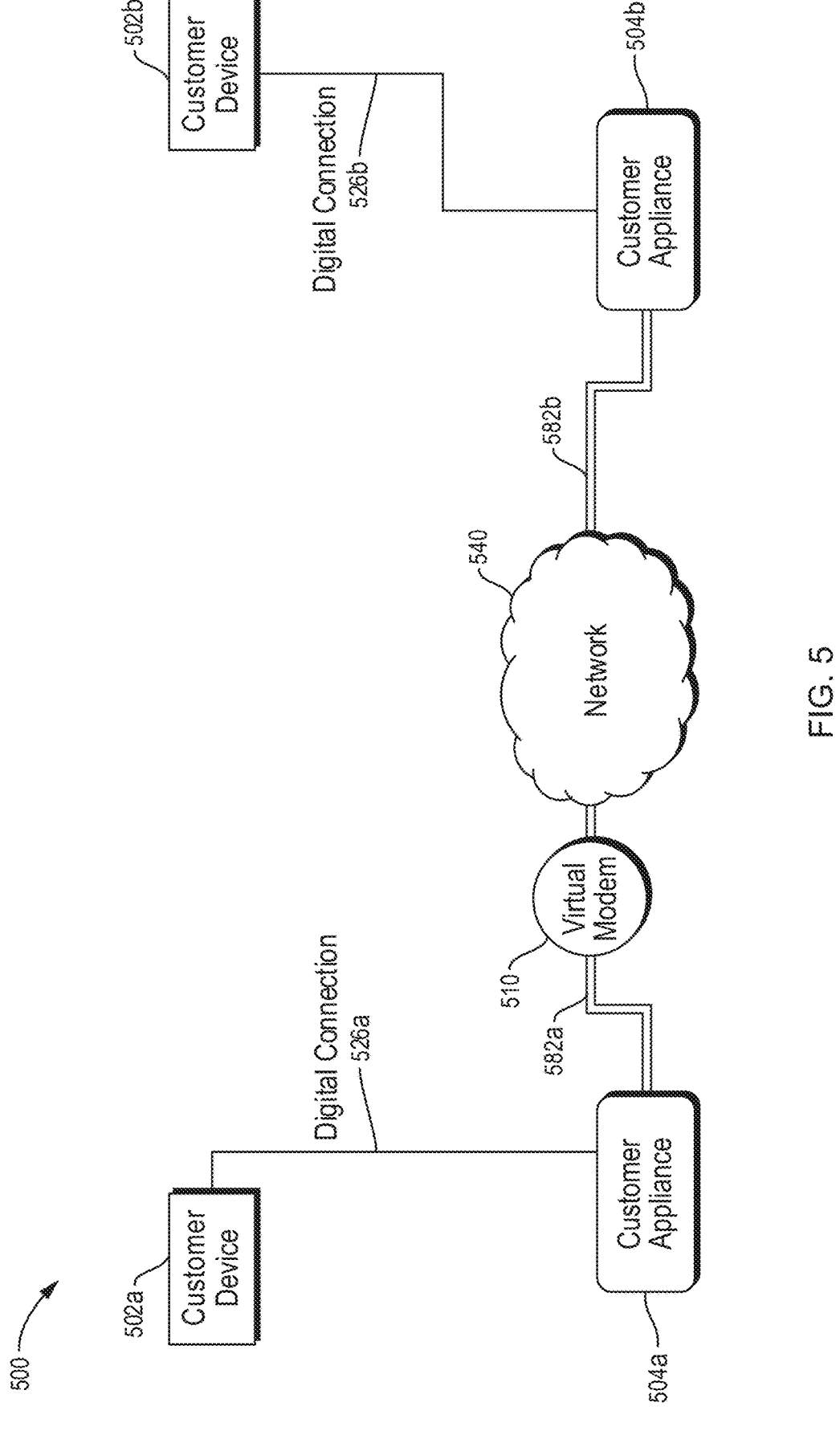

FIG. 5 is a block diagram of an example system 500 according to another embodiment. In an embodiment, FIG. 5 illustrates another example of modem communications over IP using SIP or hybrid SIP and TDM. As shown in FIG.

5, the system 500 includes customer devices 502*a* and 502*b*, which may be, e.g., CPEs or RS232 endpoints, etc. The devices 502*a* and 502*b* have digital connections 526*a* and 526*b* to customer appliances 504*a* and 504*b*, respectively. The connections 526*a* and 526*b* may be serial connections such as DB9/DE9, RS232, or USB connections. In an embodiment, the appliances 504*a* and 504*b* may be, e.g., EPIK® Edge devices. The appliance 504*b* may connect to network 540 and/or transmit and receive data (not shown) via the network 540. The network 540 may be a VoIP network or a hybrid VoIP and TDM/public switched telephone network. A virtual modem 510 may intercept communications (not shown) via the network 540 and transmit the intercepted communications to the appliance 504*a*.

Continuing with FIG. 5, according to an embodiment, in contrast with FIG. 4, both sides of connection 582*a*-582*b* replace a traditional modem with the appliances 504*a* and 504*b*. In an embodiment, a virtual modem component, e.g., 510, may perform audio to digital conversion for one leg or portion of the connection 582*a*-582*b*. According to another embodiment, the configuration shown in FIG. 5 may reflect a specialized application of a peering framework, which may provide a variety of functionality, including, e.g., on-net routing.

Figure 6:
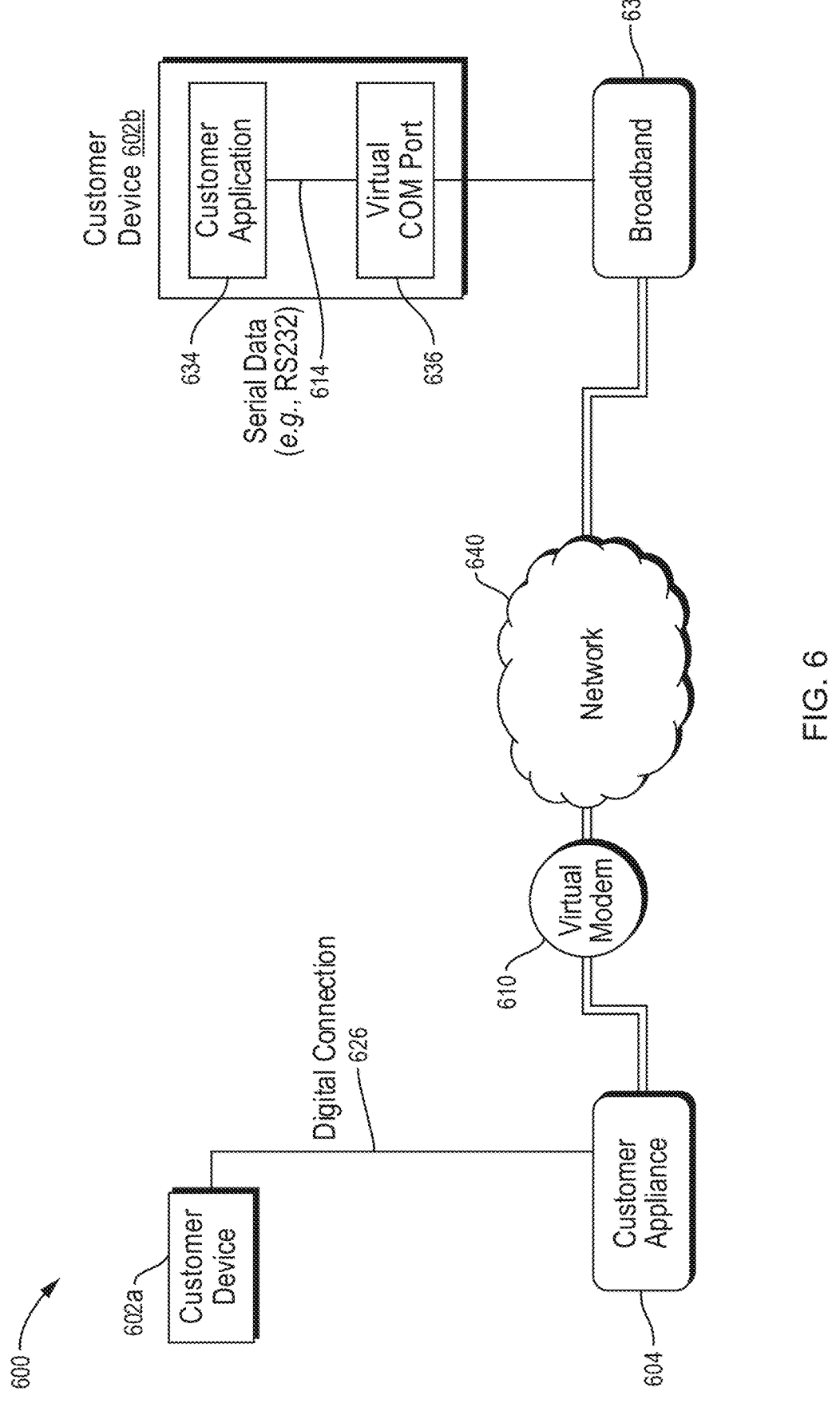

FIG. 6 is a block diagram of an example system 600 according to yet another embodiment. In an embodiment, FIG. 6 illustrates yet another example of modem communications over IP using SIP or hybrid SIP and TDM. As shown in FIG. 6, the system 600 includes customer devices 602*a* and 602*b*, which may be, e.g., CPEs or RS232 endpoints, etc. The device 602*a* has a digital connection 626 to customer appliance 604. The connection 626 may be a serial connection such as a DB9/DE9, RS232, or USB connection. In an embodiment, the appliance 604 may be, e.g., an EPIK® Edge device. The device 602*b* may have a broadband connection 638 to network 640 and/or transmit and receive data (not shown) via the network 640. The network 640 may be a VoIP network or a hybrid VoIP and TDM/public switched telephone network. A virtual modem 610 may intercept communications (not shown) via the network 640 and transmit the intercepted communications to the appliance 604.

Continuing with FIG. 6, according to an embodiment, instead of using hardware, the device 602*b* may employ a software-based approach that incorporates a virtual COM port 636 (provided by, e.g., an EPIK® software client), such as described hereinbelow in relation to FIG. 16. According to one such embodiment, a user (e.g., 118 (FIG. 1)) of customer application 634 may select a COM port, e.g., 636, that is an emulated port corresponding to a virtual modem module, e.g., 610. In other words, the virtual COM port 636 may function as a software client and may interface with a teletype (TTY) tool such as ProComm™ (Datastorm Technologies, Inc., Columbia, MO) and PuTTY™. According to an embodiment, the broadband, e.g., IP and/or Ethernet, connection 638 may be made by inputting a serial number of the appliance 604 to the application 634, e.g., a TTY tool. In turn, the application 634 may transmit serial data 614 via the virtual COM port 636.

Figure 7:
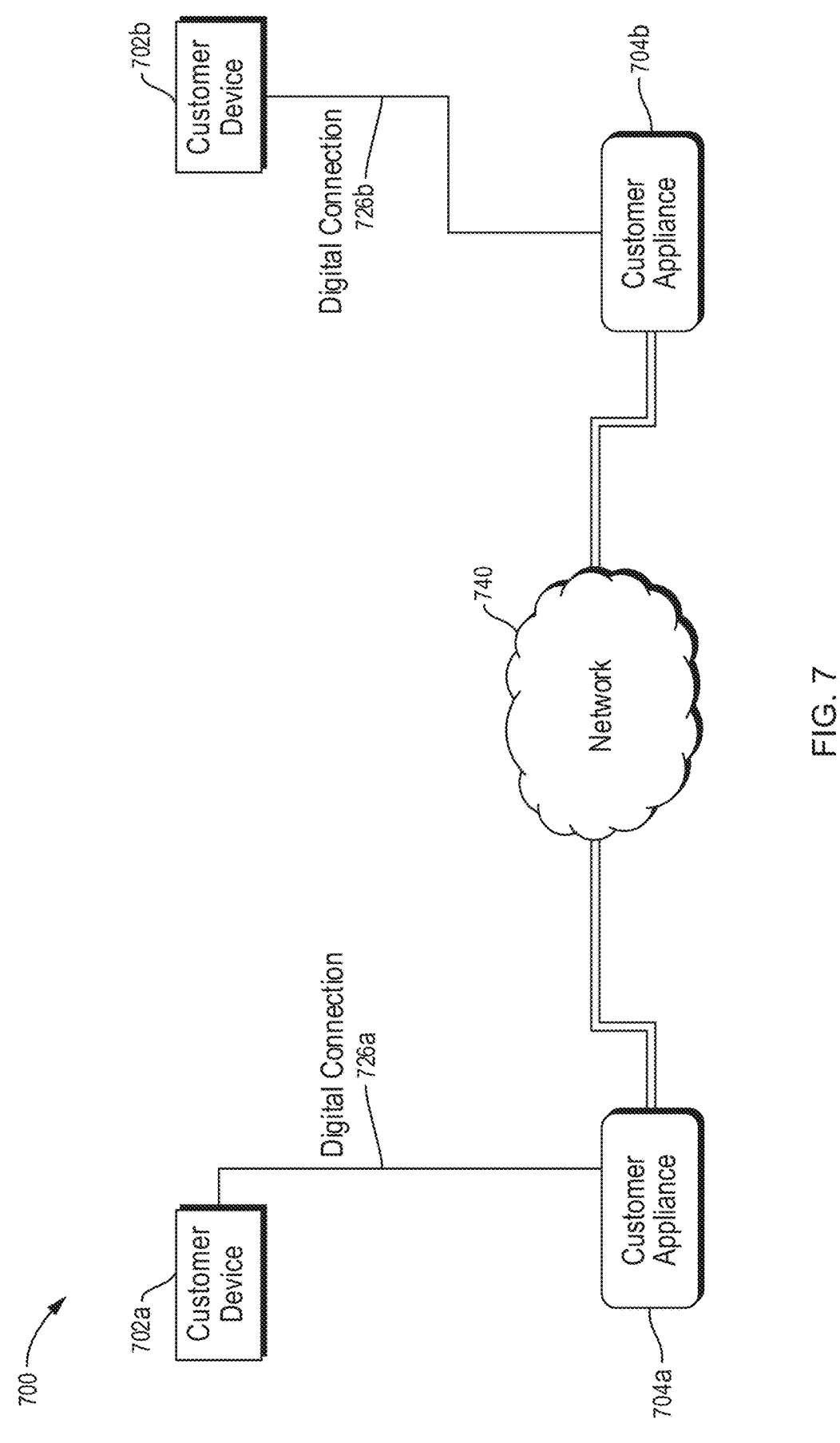

FIG. 7 is a block diagram of an example system 700 according to an embodiment. In an embodiment, FIG. 7 illustrates an example of modem communications over IP with customer appliances 704*a* and 704*b*, e.g., EPIK® Edge devices, on both the client side (e.g., customer device 702*a* side) and server side (e.g., customer device 702*b* side). As shown in FIG. 7, the system 700 further includes customer devices 702*a* and 702*b*, which may be, e.g., CPEs or RS232 endpoints, etc. The devices 702a and 702b have digital connections 726a and 726b to the appliances 704a and 704b, respectively. The connections 726a and 726b may be serial connections such as DB9/DE9, RS232, or USB connections. The appliances 704a and 704b may connect to network 740 and/or transmit and receive data (not shown) via the network 740. The network 740 may be a VoIP network or a hybrid VoIP and TDM/public switched telephone network.

Continuing with FIG. 7, in an embodiment, the configuration shown in FIG. 7 may be a full peering arrangement that does not use any dial tones.

Figure 8:
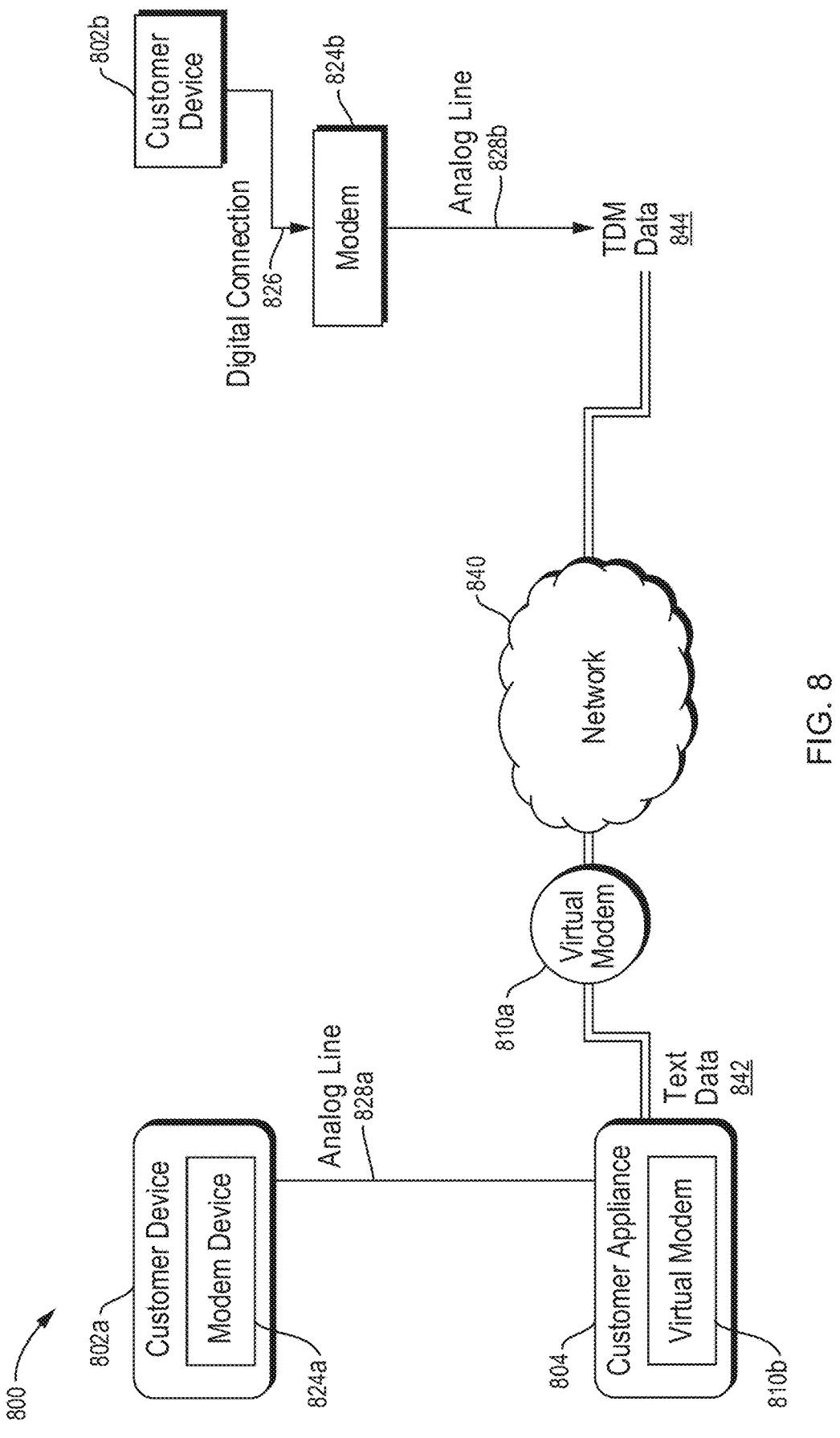

FIG. 8 is a block diagram of an example system 800 according to another embodiment. As shown in FIG. 8, the system 800 includes customer devices 802a and 802b, which may be, e.g., CPEs or RS232 endpoints, etc. The customer device 802a includes modem device 824a that connects to customer appliance 804, e.g., an EPIK® Edge device, via analog line 828a. In an embodiment, the modem device 824a may have an, e.g., RJ21, connection (not shown) for audio to serial (e.g., RS232) modulation. According to another embodiment, the connection from the modem device 824a to the appliance 804 may be via, e.g., tip and ring and/or RJ21 hand-off. In an embodiment, the appliance 804 may provide a dial tone (not shown) to the modem device 824a. The appliance 804 includes virtual modem 810b. In an embodiment, the virtual modem 810b may perform audio to serial modulation and/or convert audio to digital VoIP data. The customer device 802b has a digital connection 826 to modem 824b. The connection 826 may be a serial connection such as a DB9/DE9, RS232, or USB connection. The modem 824b may provide a dial tone to the customer device 802b and/or convert between audio and digital data. In turn, the modem 824b may connect to network 840 via analog line 828b and/or transmit and receive TDM data 844. The network 840 may be a VoIP network or a hybrid VoIP and TDM/public switched telephone network. A virtual modem 810a may intercept communications (not shown) via the network 840 and transform the intercepted communications into, e.g., text data 842, for transmission to the appliance 804.

Continuing with FIG. 8, in an embodiment, the customer device 802b on the client side may use traditional copper wire telephone infrastructure with its own modem 824b, while the opposite (server) side may use the appliance 804 to provide a dial tone to the customer device 802a with the embedded modem device 824a. The local physical modem 824a may communicate with the virtual modem 810b, which may convert analog audio (not shown) into digital IP data (not shown) and transmit it to the corresponding virtual modem 810a located at a data center (not shown). In the configuration of FIG. 8, there are two virtual modems—the virtual modem 810b within the appliance 804 and the virtual modem 810a at the data center.

Continuing with FIG. 8, in an embodiment, the modem device 824a may be, e.g., a 300/1200/2400/9600/14400 baud or 56 *kbps* modem built in to the endpoint device 802a. According to another embodiment, the device 802a and modem 824a may be designed such that they cannot be separated from each other or such that the modem 824a cannot be removed from the device 802a.

Figure 9:
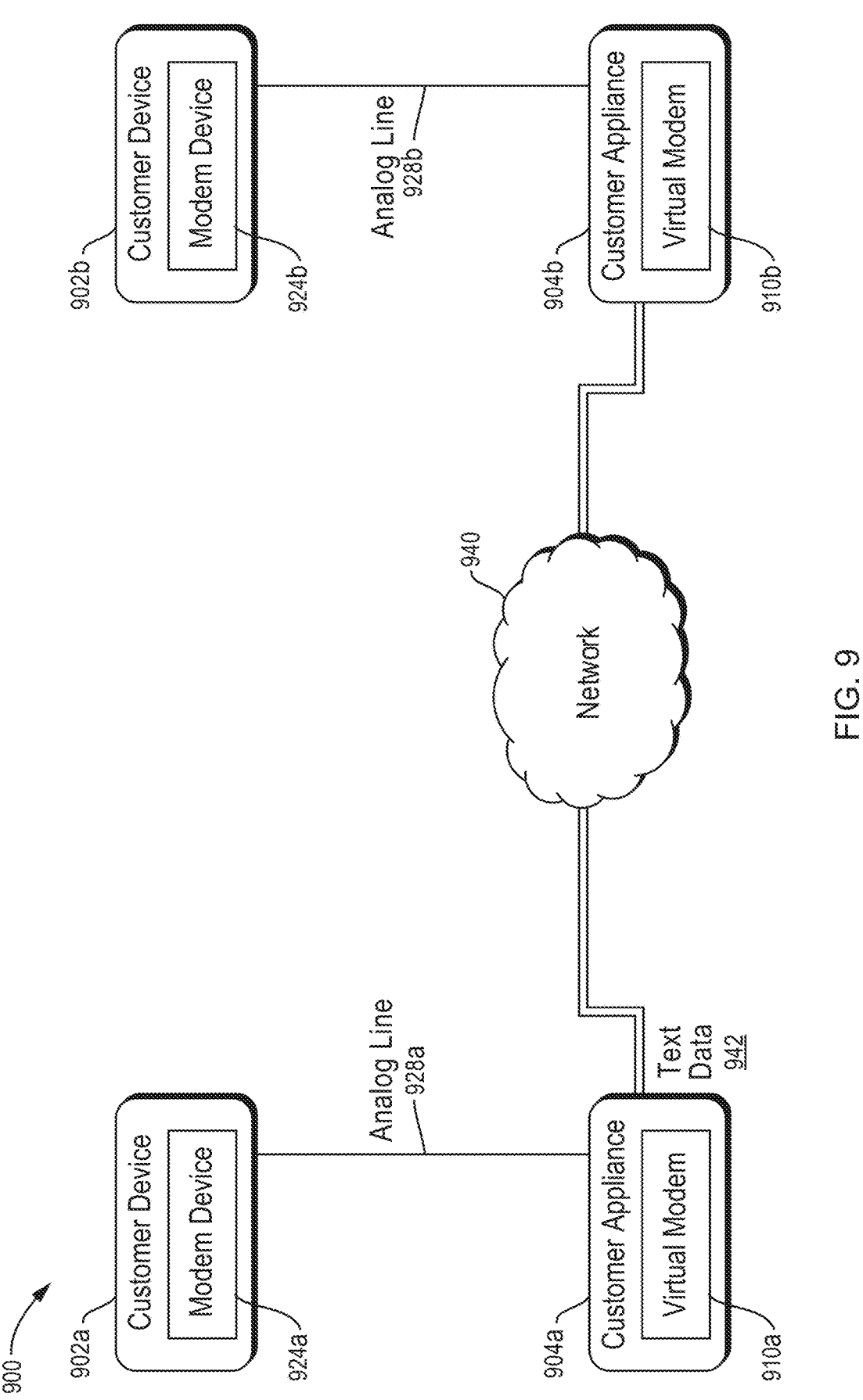

FIG. 9 is a block diagram of an example system 900 according to yet another embodiment. As shown in FIG. 9, the system 900 includes customer devices 902a and 902b, which may be, e.g., CPEs or RS232 endpoints, etc. The customer devices 902a and 902b include respective modem devices 924a and 924b. The modem devices 924a and 924b connect to customer appliances 904a and 904b, e.g., EPIK®

Edge devices, via analog lines 928a and 928b, respectively. In an embodiment, the modem devices 924a and 924b may have, e.g., RJ21, connections (not shown) for audio to serial (e.g., RS232) modulation. According to another embodiment, the respective connections from the modem devices 924a and 924b to the appliances 904a and 904b may be via, e.g., tip and ring and/or RJ21 hand-offs. In an embodiment, the appliances 904a and 904b may provide a dial tone (not shown) to the modem devices 924a and 924b, respectively. The appliances 904a and 904b include virtual modems 910a and 910b, respectively. In an embodiment, the virtual modems 910a and 910b may perform audio to serial modulation and/or convert audio to digital VoIP data. The appliances 904a and 904b may connect to network 940 and/or transmit and receive, e.g., text data 942. The network 940 may be a VoIP network or a hybrid VoIP and TDM/public switched telephone network.

Continuing with FIG. 9, in an embodiment, both customer devices 902a and 902b may use the appliances 904a and 904b, respectively, which each provide a dial tone directly to the connected modems 924a and 924b. Each appliance 904a and 904b may contain a virtual modem 910a and 910b, respectively, which acts as a proxy for the respective physical modems 924a and 924b. The two virtual modems 910a and 910b may communicate over IP, effectively eliminating latency and jitter across a connection (not shown). In the configuration of FIG. 9, there are two virtual modems, virtual modem 910a at the appliance 904a and virtual modem 910b at the appliance 904b.

Continuing with FIG. 9, in an embodiment, the modem devices 924a and 924b may be, e.g., 300/1200/2400/9600/14400 baud or 56 kbps modems built in to the respective endpoint devices 902a and 902b. According to another embodiment, the devices 902a/902b and modems 924a/924b may be designed such that they cannot be separated from each other or such that the modems 924a/924b cannot be removed from the devices 902a/902b.

Example Methodologies

In an embodiment, when an, e.g., inbound, modem call is received, instead of the call being picked up by a device at the receiving end, the call may be intercepted at an earlier point, e.g., a closest point to the PSTN or a point of entry into an IP network (e.g., at a data center).

According to an embodiment, a virtual modem, e.g., at a point of interception, hosted at the data center, etc., may pick up a call. The virtual modem may mimic the behavior of a physical modem and may be capable of communicating at various baud rates (e.g., 300, 1200, 2400, 9600, etc.).

In an embodiment, a virtual modem may convert a modem signal into IP packets at the data center level, ensuring that the call is digitized and packetized as early as possible. By performing this conversion at the data center, e.g., before the traffic traverses a broader IP network, any potential latency, jitter, or packet loss can be minimized.

According to an embodiment, a digitized signal may then be transported over an IP network to a receiving end as a serial, e.g., RS232, stream, ensuring a more reliable transmission. The receiving device at the customer end may simply connect to the RS232 stream, eliminating the need for a modem-to-modem connection and, thus, avoiding problems caused by network delays or jitter with traditional approaches.

An example method according to an embodiment may ensure that a modem connection is more stable and that higher baud rates (such as 9600 baud or above) are more reliably supported over IP networks.

Conventional and Example Innovative Transmission Processes

Figure 10:
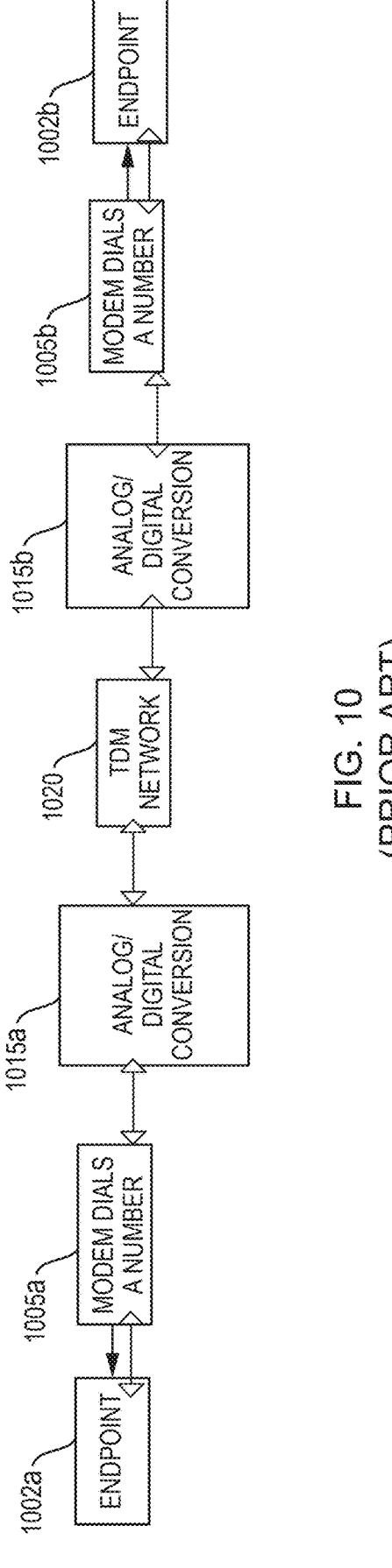
FIG. 10 illustrates an example of a traditional modem communication process.

FIG. 10 illustrates an example of a traditional modem communication process 1000 between endpoints 1002a and 1002b via TDM network 1020.

In FIG. 10, the traditional process 1000 may include a call (not shown) going through various example stages as follows:

a) modem dialing 1005a/1005b b) analog/digital conversion 1015a/1015b i. For instance, a modem communication may be converted to audio tones (e.g., G.711), to digital (e.g., RS232), and/or audio to digital packet reassembly may be performed.

c) IP transmission (not shown)

d) final reassembly (not shown)

Each of the above steps in the traditional process 1000 introduces potential latency or packet loss.

Figure 11:
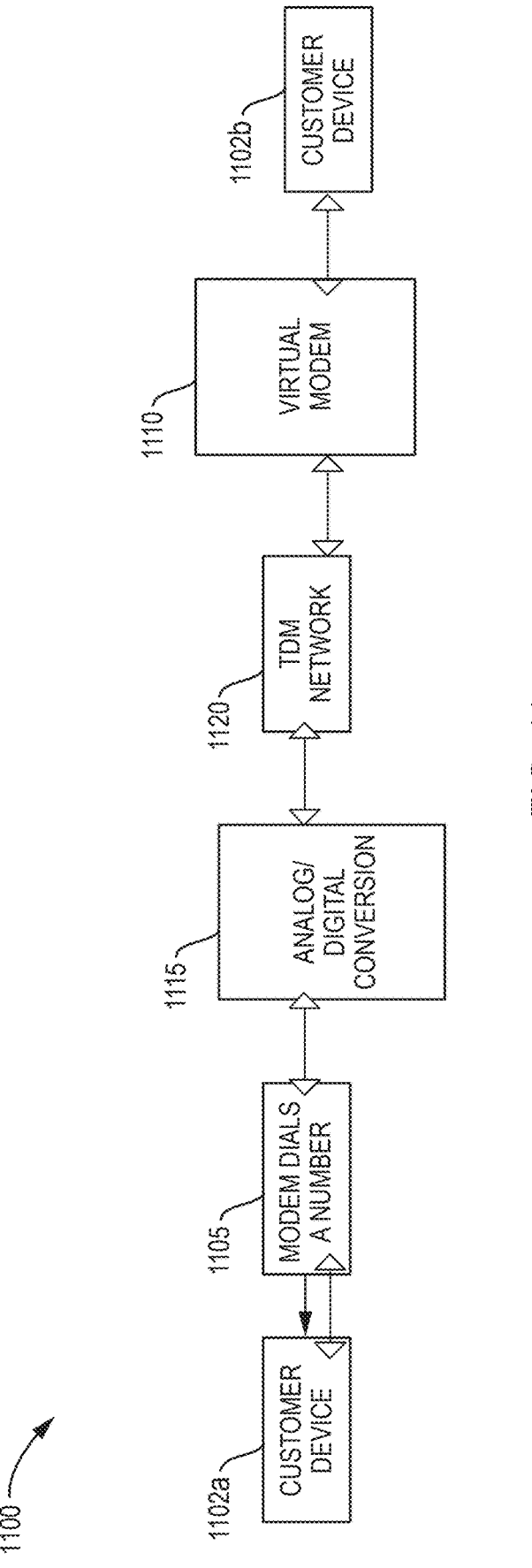
FIG. 11 illustrates an example of a virtual modem process for modem communications over IP according to an embodiment.

FIG. 11 illustrates an example of a virtual modem process 1100 for modem communications over IP between customer devices 1102a and 1102b via network 1120 according to an embodiment. As shown in FIG. 11, similar to FIG. 10, modem dialing 1105 and analog/digital conversion 1115 are performed for a call (not shown) from the device 1102a.

In FIG. 11, the process 1100 features a virtual modem 1110 at a data center. According to an embodiment, a call (not shown) may be intercepted and handled by the virtual modem 1110 as early as possible in the process 1100, minimizing latency and ensuring a more stable serial (e.g., RS232) stream to the end device 1102b. In another embodiment, the virtual modem 1110 may transform IP data to serial data or directly stream serial data over an IP connection.

As shown in FIG. 11, the innovative process 1100 minimizes problems like jitter, latency, and packet loss, ensuring reliable modem communications over IP, even at higher baud rates.

Example OOBM Techniques

Embodiments may provide OOBM methods of communication, including for non-limiting examples:

a) OOBM via TTY (e.g., PuTTY);

b) OOBM via online interface (e.g., a web application to control a customer appliance);

c) OOBM via phone number dial-in; and d) OOBM via COM port transcoding.

For instance, when a network (e.g., a local area network (LAN)) experiences a failure, a network router can be restarted, powered up, or powered down, etc., using example OOBM techniques according to embodiments.

Example OOBM techniques according to embodiments can enhance the use of POTS replacement devices, such as by enabling efficient remote administration and troubleshooting of connected endpoints. Moreover, embodiments offer secure and convenient remote management features, improving the overall functionality and resilience of telecommunications infrastructure. Example OOBM techniques according to embodiments provide connectivity to serial (e.g., RS232, RS422, or RS485) and/or secure remote IP connectivity for OOBM.

FIG. 12 is a block diagram of an example system 1200 for OOBM according to an embodiment. As shown in FIG. 12, the system 1200 includes a remote management console 1248, a network 1240, a customer appliance 1204, and customer devices 1202a and 1202b. In an embodiment, the user 1218 may use the remote management console 1248 to transmit at least one OOBM command 1252 via the network 1240 to the appliance 1204 and, in turn, to the device 1202a. According to another embodiment, the appliance 1204 may have a digital connection 1226 to the device 1202b. In an embodiment, the connection 1226 may be a serial output (e.g., RS232, DB9, or USB) connection.

Figure 13:
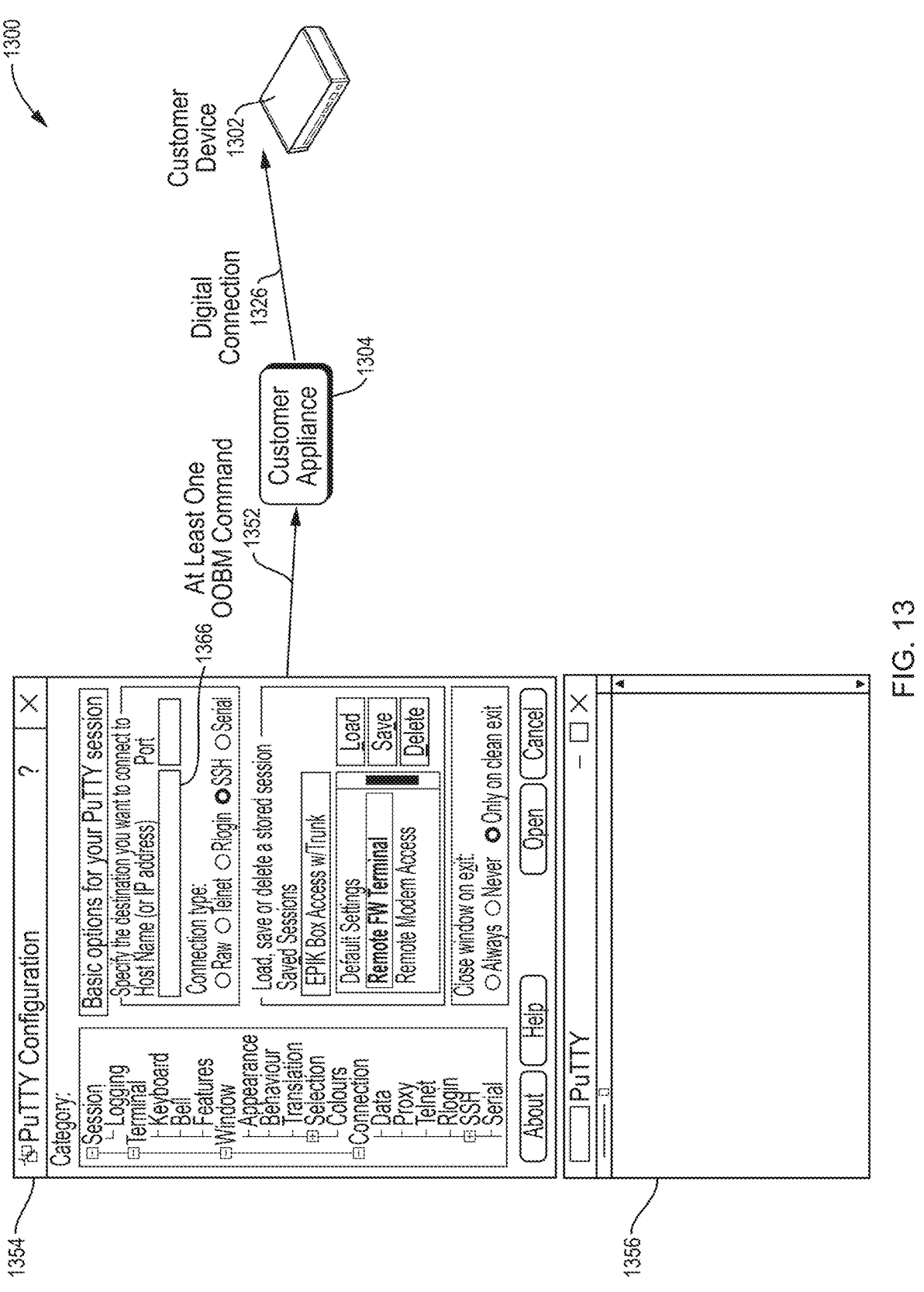
FIG. 13 is a block diagram of an example system for OOBM via teletype (TTY) according to an embodiment.

FIG. 13 is a block diagram of an example system 1300 for OOBM via TTY according to an embodiment. FIG. 13 illustrates an example of OOBM via TTY tool 1354, e.g., using PuTTY, ProComm, or other suitable known tool, according to an embodiment. In an embodiment, a connection to a customer appliance 1304, e.g., an EPIK® Edge device, may be made by using the appliance 1304's serial number. According to one such embodiment, the serial number may be the appliance 1304's phone number, and a corresponding hostname or network address of the appliance 1304 for inputting into user interface element 1366 of the TTY tool 1354 may be in the form of [phonenumber].epikedge.io, e.g., 9876543210.epikedge.io. In an embodiment, upon connecting to the appliance 1304, a user (e.g., 1218 (FIG. 12)) may be provided with a remote terminal interface 1356 for transmitting at least one OOBM command 1352 to customer device 1302 via the appliance 1304. According to another embodiment, the appliance 1304 may have a digital connection 1326 to the device 1302. In an embodiment, the connection 1326 may be a serial output (e.g., RS232, DB9, or USB) connection.

Figure 14:
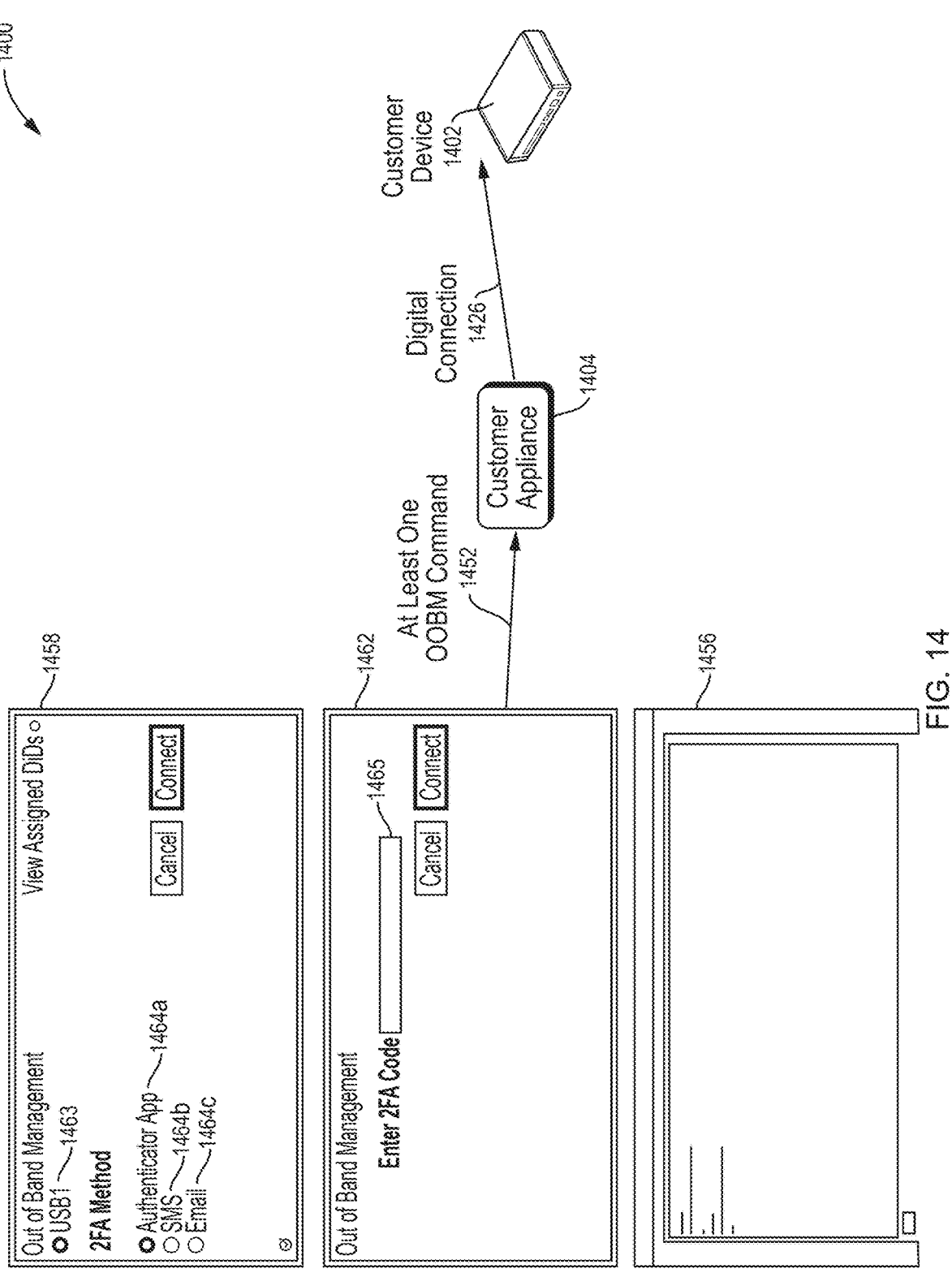
FIG. 14 is a block diagram of an example system for OOBM via an online interface according to an embodiment.

FIG. 14 is a block diagram of an example system 1400 for OOBM via an online interface 1458 according to an embodiment. In an embodiment, the system 1400 may include a remote terminal interface or endpoint access console 1456, for managing customer device 1402, that is similar to the TTY tool interface 1356 of FIG. 13, but the interface 1456 may be provided online instead, such as via a web-based user interface, e.g., my. epik. io. This may be convenient for users (e.g., 1218 (FIG. 12)) who do not wish to install a TTY tool on their own systems. According to another embodiment, the system 1400 may also provide a two-factor authentication (2FA) interface 1462 or other suitable known multi-factor authentication techniques for added security and privacy. In one such embodiment, the 2FA interface 1462 may vary depending on which 2FA option 1464a-1464c is requested by the user. For example, the 2FA interface 1462 may prompt a user to enter a 2FA code via user interface element 1465 when the option 1464a for 2FA via authenticator app is selected. According to an embodiment, the online interface 1458 may prompt the user to select a connected endpoint, e.g., 1402, via user interface element 1463. In an embodiment, upon connecting to customer appliance 1404, the user may be provided with the remote terminal interface 1456 for transmitting at least one OOBM command 1452 to the device 1402 via the appliance 1404. According to another embodiment, the appliance 1404 may have a digital connection 1426 to the device 1402. In an embodiment, the connection 1426 may be a serial output (e.g., RS232, DB9, or USB) connection.

Figure 15:
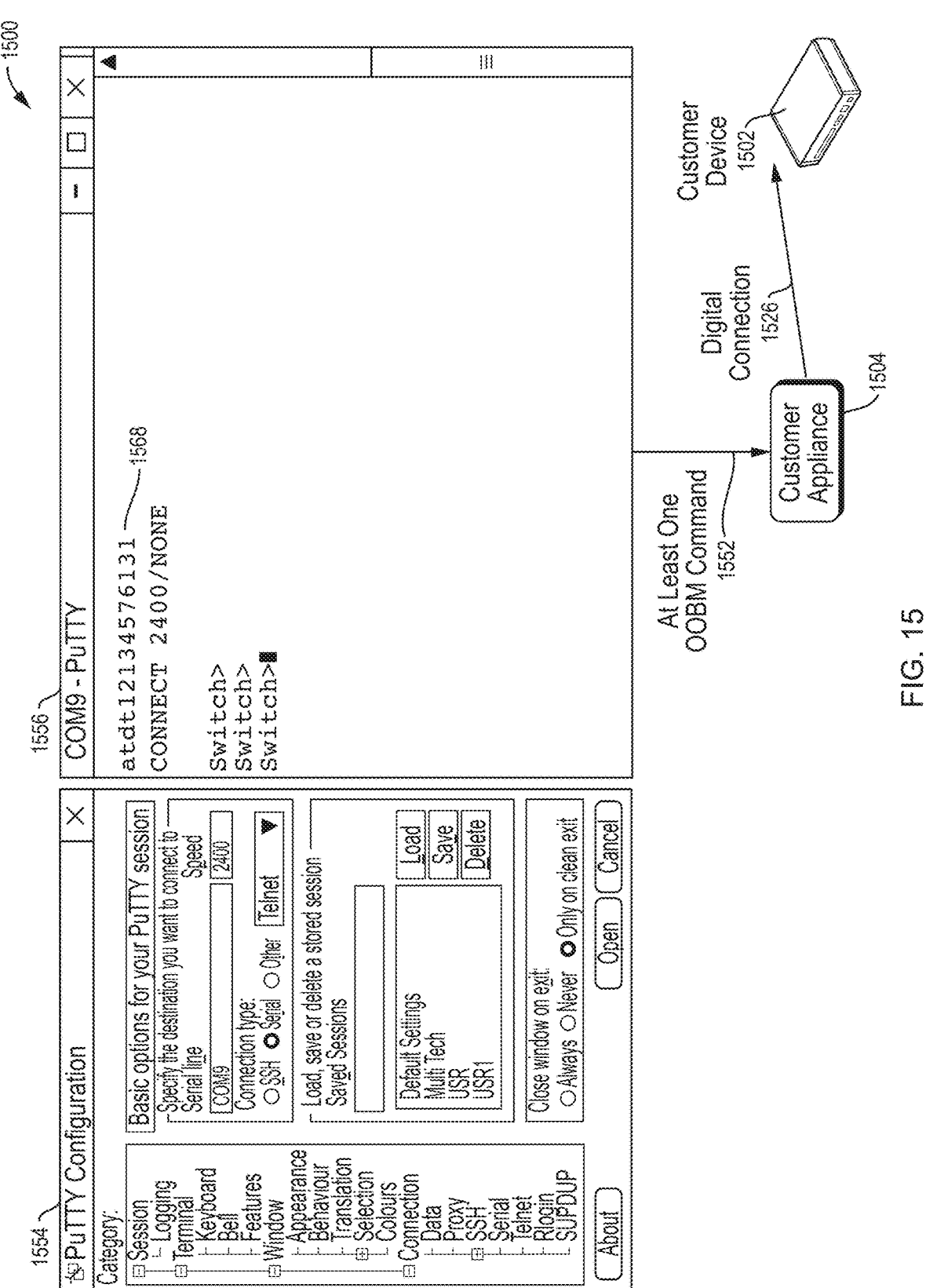
FIG. 15 is a block diagram of an example system for OOBM via dial-in according to an embodiment.

FIG. 15 is a block diagram of an example system 1500 for OOBM via dial-in according to an embodiment. In an embodiment, TDM-based dialing of a phone number 1568 via a traditional COM port may result in connecting to a virtual modem (not shown) at a datacenter, which may perform analog to digital conversion. According to one such embodiment, a user dialing the phone number 1568 via a TTY tool 1554 may experience the virtual modem directly connecting to a remote customer appliance 1504. In an embodiment, upon connecting to the appliance 1504, the user may be provided with remote terminal interface 1556 for transmitting at least one OOBM command 1552 to customer device 1502 via the appliance 1504. According to another embodiment, the appliance 1504 may have a digital connection 1526 to the device 1502. In an embodiment, the connection 1526 may be a serial output (e.g., RS232, DB9, or USB) connection.

Figure 16:
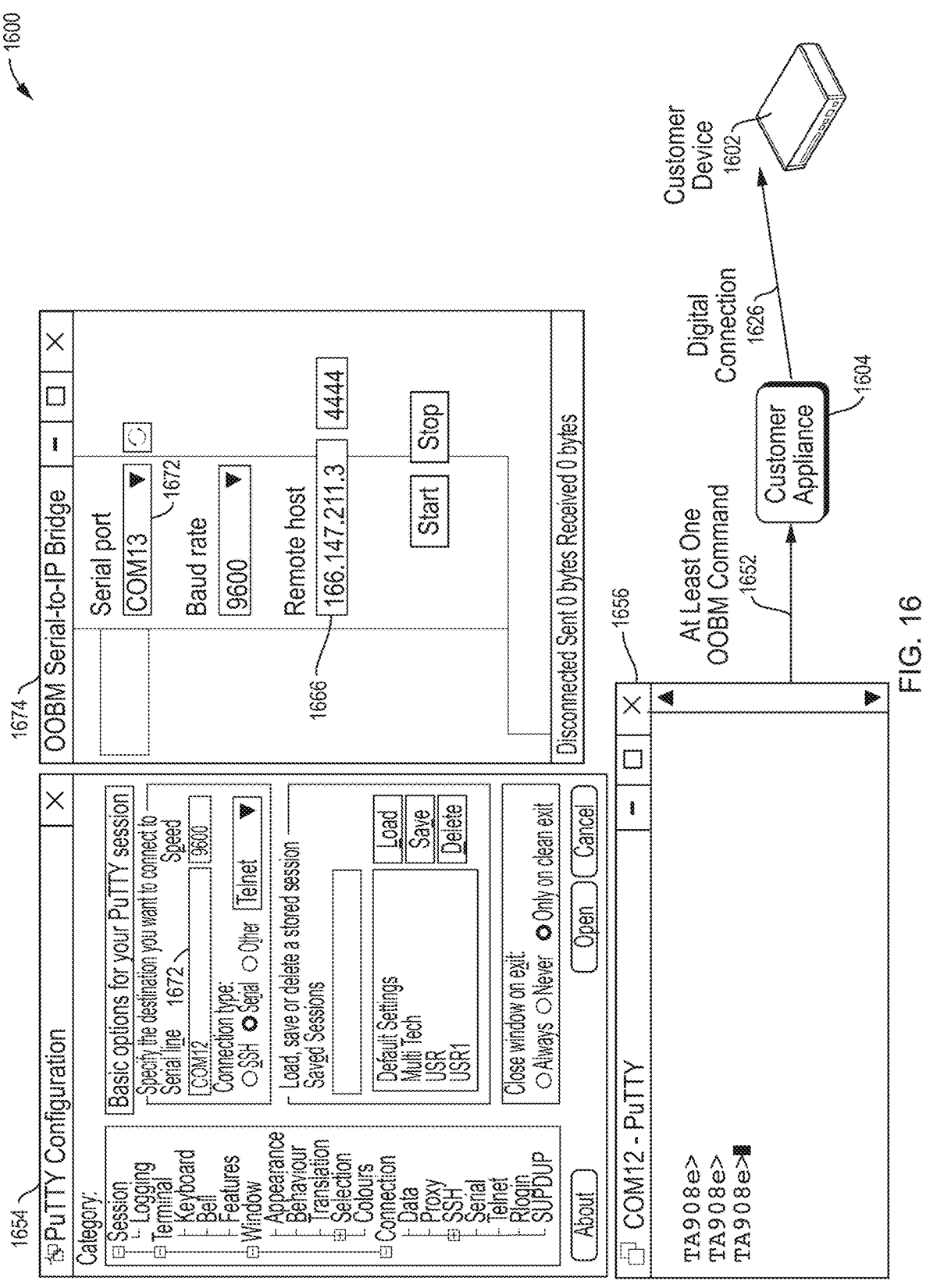
FIG. 16 is a block diagram of an example system for OOBM via COM port transcoding according to an embodiment.

FIG. 16 is a block diagram of an example system 1600 for OOBM via COM port transcoding according to an embodiment. In an embodiment, the approach of FIG. 16 may be a software-only technique, where a, e.g., transcoded, emulated, or virtual COM port input into user interface element 1672 of TTY tool 1654, is provided and configured via user interface 1674 for bridging to a remote host via broadband using an IP address or hostname, which may be input via user interface element 1666. In an embodiment, upon connecting to customer appliance 1604, a user may be provided with remote terminal interface 1656 for transmitting at least one OOBM command 1652 to customer device 1602 via the appliance 1604. According to another embodiment, the appliance 1604 may have a digital connection 1626 to the device 1602. In an embodiment, the connection 1626 may be a serial output (e.g., RS232, DB9, or USB) connection.

Example Artificial Intelligence (AI)/ML Functionality Beyond connectivity and improved communication functionalities, embodiments, i.e., MPR, may provide analytics, e.g., through use of AI/ML functionality. An embodiment may capture audio packets during modem communications and analyze the captured packets to extract key data points that feed predictive models. Using historical communication data, these models may learn subtle patterns, predict reliability, rate call quality, and anticipate problems at the application layer where traditional voice-layer metrics overlook errors or miss issues. By identifying or surfacing application-layer anomalies early, embodiments may enable proactive detection and mitigation, which improves stability and overall system reliability. In an embodiment, a combination of real-time transport and application-layer predictive analytics may be especially useful for maintaining and improving modem-based communications.

An example embodiment may transform audio files or real time audio streams from modem or alarm communications into structured features for use with AI/ML models. By training on both successful and failed connections, the models may learn patterns and produce a confidence score for each attempt. Confidence scores may be used to quickly separate healthy from risky calls at the application layer where voice metrics alone are inadequate.

An example embodiment may tie predictions into a logic engine for real-time or post-install troubleshooting. Based on confidence thresholds, an example logic engine may:

a) Trigger deeper diagnostics or high detail logging when confidence drops;

b) Recommend specific corrective steps or preventive maintenance when application layer patterns suggest trouble ahead; and/or c) Guide technicians through targeted checks that reduce guesswork and speed resolution.

A predictive approach of an example embodiment may go beyond voice metrics to identify or expose real application-level causes, improving installation outcomes and ongoing reliability.

Example Modeling Stack

An example embodiment may use, e.g., scikit-learn and k-nearest neighbors (k-NN), as baselines, and a large language model (LLM) such as DeepSeek to turn feature determinations or findings into technician-friendly guidance and/or automatically implement actions, e.g., a device update, a device reconfiguration, a device reset, etc. An example model according to an embodiment may train on labeled audio from successful (good) and unsuccessful (bad) modem and/or alarm sessions, including, e.g., Contact ID traffic. An example embodiment may explore features from tone frequency content, timing patterns, and other signal traits, etc.

An example embodiment may model modem and Contact ID audio. For modem and alarm signaling, an example embodiment may use protocol-aware features that are superior to generic speech features.

Example Training Data and Data Labeling

An example embodiment may employ per call labels that are specific: e.g., success, fail, retry, partial decode, wrong account, checksum error, kiss-off missing, timeout, etc.

An example embodiment may store metadata that impacts audio: e.g., codec path (if VoIP), packet loss and jitter, sample rate, automatic gain control (AGC) status, peak level, clipping ratio, etc.

For Contact ID, an example embodiment may use a 16-digit payload, per-digit confidence, and where a first error is detected (or shows up).

In an embodiment, preprocessing and segmenting may include, e.g., resampling to 8 kHz mono and/or linear pulse-code modulation (PCM). According to another embodiment, a band limit of, e.g., about 300 to 3400 Hz may be applied. In an embodiment, digital signal processing (e.g., that was performed for compensation) may be removed to permit a wider range of audio frequencies for training AI/ML models. According to another embodiment, audio frequencies may be normalized to a consistent root mean square (RMS) so amplitude features are comparable.

Example Protocol Phase Segmenting

An embodiment may perform segmentation by analyzing answer/handshake tones and phase reversals. For instance, an embodiment may find a 2100 Hz answer tone, find a 1400 Hz 100 ms burst, then 100 ms pause, then 2300 Hz 100 ms burst, followed after another 100 ms pause by dual-tone multi-frequency (DTMF) digit burst and gaps. Deviations in the above example sequence may be a common failure point. An example model of embodiments can be trained to detect deviations (such as 100 ms pauses) and compensate for them.

In an embodiment, a protocol may have specific requirements for the ordering and contents of modem communications sequences. When modem communications are packetized and transmitted via IP, issues such as packet loss or latency may cause IP packets to be received out of order. In turn, this may corrupt the ordering of the underlying modem communications sequence. AI/ML models according to embodiments may be trained based on pre-identified successful and unsuccessful modem communications sequences. The models may thus be able to detect and correct issues that arise in conducting modem calls via IP, instead of simply allowing the calls to fail as a result of the issues.

In an embodiment, timestamps for each boundary may be retained. These times and durations may be very predictive.

Example Protocol-Aware Features

Embodiments may identify protocol-relevant features and train models to predict or identify events in communications based on the features. The following are non-limiting examples of protocol-aware features according to an embodiment:

a) Contact ID Features i. Handshake composition and timing deltas from specification: measure how close a 1400-pause-2300 sequence is to a nominal 100-100-100 ms pattern, and the wait before digits. Large deltas may predict failure.

ii. Per digit DTMF features using a Goertzel bank:

1) Low-group and high-group magnitude, frequency drift, and signal-to-noise ratio (SNR).

2) Twist (high versus low level difference) and its time variation across a digit.

3) On-duration and off-gap duration; jitter across digits.

4) Harmonic and intermodulation, which may indicate clipping or codec artifacts.

5) Digit order and checksum validity flags.

6) DTMF uses pairs from 697, 770, 852, 941 Hz and 1209, 1336, 1477, 1633 Hz, and reliable receivers expect at least about 40 ms of tone with proper separation. These facts may be used to set detection windows and tolerances.

b) "ANS" 2100 Hz Answer Tone Features i. Presence, duration, and exact phase reversal cadence of the 2100 Hz tone during modem/fax answer. Phase reversals roughly every 425 to 475 ms may be used to knock echo cancellers offline; absence or irregular cadence may be a red flag in VoIP paths. Cadence error, level, and SNR may be tracked.

ii. Echo control interaction flag: a network disabling echo control after ANS with phase reversals may be observed and the observation recorded. Persistent echo control alongside data tones may be a strong failure predictor.

c) Modem Training Features (e.g., generic features across International Telecommunication Union Telecommunication Standardization Sector (ITU-T) V-Series)

i. Cross correlation to reference training sequences in an early handshake. Dynamic time warping (DTW) distance may be used as a scalar feature.

ii. Instantaneous frequency stability for FSK phases, constellation onset stability for phase-shift keying (PSK)/Quadrature Amplitude Modulation (QAM) phases, and carrier acquisition time.

iii. Equalizer convergence proxy: log-likelihood or error vector magnitude proxy from a digital signal processor (DSP).

iv. Time to symbol lock, retrain events, and downshift attempts.

d) Channel/Codec Artifact Features (e.g., VoIP or recorded paths)

i. Packet loss surrogates: repeated frames, "steppy" amplitude, or spectrum stalls typical of packet loss concealment.

ii. Clipping ratio, crest factor, spectral flatness, and noise floor.

iii. Time warping estimate from best fit resample factor across a multi-second region may be used to identify or catch jitter buffer variants.

e) General Spectral Features (e.g., for models that use images)

i. Short time Fourier spectrograms or constant-Q transform (CQT) for 300-3400 Hz, plus deltas.

Example Stack Modeling Options

The following are non-limiting examples of stack modeling options according to an embodiment:

a) Fast baselines in scikit-learn: Logistic regression and linear support vector machines (SVMs) may be used on engineered features. Probabilities may be calibrated with Platt scaling or isotonic regression.

b) k-NN may be used for confirmation (e.g., as a sanity check). k-NN may be appropriate (and/or strong) when features are normalized and segmenting is performed accurately (and/or well).

c) Tree ensembles: Gradient boosted trees or random forests may be used for non-linear interactions and modeling missing features cleanly.

d) Sequence aware: Hidden Markov models (HMMs) or a small one-dimensional (1D) convolutional neural network (CNN) may be used over a feature time series for digit-by-digit predictions, then aggregated into a call-level score.

e) Spectrogram CNN: A small two-dimensional (2D) CNN may be used on 1 second spectrogram chips for challenging (or hard) cases such as codec-damaged digits.

f) Anomaly detection: A one-class SVM may be used on successful (or "good") calls to identify or flag novel failure modes.

Example Confidence Scoring and Logic Engine

An example embodiment may produce both a, e.g., calibrated, call level probability of success and phase level health flags: e.g., handshake OK, ANS cadence OK, DTMF timing OK, checksum OK, codec artifacts present, clipping present, etc.

As one example, if ANS cadence is off or missing and codec artifacts are present, an embodiment may recommend forcing G.711, disabling echo control for voiceband data (VBD), and/or using out of band DTMF where applicable.

As another example, if twist variance or on/off timing is out of range, an embodiment may recommend gain adjustments or turning off aggressive AGC on a path.

As yet another example, if a checksum fails but timing is clean, an embodiment may suggest a redial or alternate receiver number to exclude or rule out tandem codec damage.

Example Data Augmentation

The following are non-limiting examples of data augmentation techniques according to an embodiment: adding additive white Gaussian noise (AWGN), small resample warps, companding (a-law and u-law), controlled clipping, and reverberation that mimics handset couplers.

If Real-time Transport Protocol (RTP) is used for transiting, an embodiment may generate paired audio paths with in-band tones and with RFC 2833 OOB events to label which data "survives"—e.g., is successfully transmitted via—one of the two different paths.

Example Model Evaluation and Guardrails

An embodiment may split training data by site or phone number prefix to avoid leakage.

Another embodiment may optimize for high recall on unsuccessful or bad calls, then tune precision with thresholding. In an embodiment, a ranked queue by risk may be displayed or shown for technicians.

An embodiment may track a confusion matrix by failure type, not just overall.

Another embodiment may use SHapley Additive exPlanations (SHAP) or permutation importance to keep a playbook grounded in features that are readily understood by technicians.

Example Unique Features

The following are non-limiting examples of unique features according to an embodiment:

a) Handshake "barcode" distance: DTW distance between a measured 1400-pause-2300 pattern and a nominal template, as a single scalar.

b) ANS cadence stability index: standard deviation of reversal intervals around 450 ms.

c) Digit twist drift: slope of twist across a 50 ms burst; drifting twist may often signal AGC or transcoding stress.

d) Codec signature score: a small classifier that predicts G.711 versus compressed speech based on spectral flatness and zero crossing jitter. A result may then be input or fed to a main AI/ML model.

e) Checksum margin: edit distance between received and expected Contact ID after correcting the most likely single digit error. This may help separate "one glitch" from systemic damage.

Example AI/ML Models

The following are non-limiting examples of AI/ML models used with, e.g., audio tones and/or Contact ID data, according to an embodiment:

a) Classic DSP+a tiny learned gate
  i. Thresholds for eight DTMF bins may be determined, then a small classifier may be trained on per-digit features (SNR, twist, drift, on/off time) to reduce false positives in noisy VoIP paths. A Goertzel approach may be used as it is standard for DTMF and lightweight.

b) Keyword-spotting (KWS)-style CNNs
  i. Each DTMF digit or handshake segment may be used as a "keyword." A small 2D CNN may be used on log-mel spectrograms or a 1D CNN may be used on waveforms. A small footprint KWS technique (deep NN (DNN)/CNN/depth-wise separable (DS) CNN) may target low latency, low memory edge use, and may map well to tones.

c) Learnable front-ends that lock onto narrowband tones
  i. SincNet may learn parametrized band pass filters directly from raw audio on a network to "learn the bins" around 1400, 2300, and DTMF pairs without hand crafting.
  ii. LEarnable Audio Frontend (LEAF) may replace fixed mel filterbanks with a learnable front-end. A front-end may adapt to both modem tones and voice contamination.

d) Pretrained audio encoders for robustness
  i. Pretrained audio encoders may be used as frozen feature extractors, then a small head model may be used for classification or quality scoring: e.g., wav2vec 2.0, HuBERT, WavLM.
  ii. Pretrained audio encoders may learn general speech representations that transfer well to noisy telephony audio. An embodiment may freeze a backbone and fine-tune a head model on successful versus unsuccessful (or "good versus bad") segments.
  iii. Audio spectrogram transformers (ASTs) and pretrained audio neural networks (PANNs) may be useful for spectrogram chips when stronger invariance is needed. YAMNet is a compact MobileNet based option.

e) Utility models
  i. Voice Activity Detection (VAD) may be used to segment out non-speech tone regions before decoding: e.g., WebRTC VAD or the neural Silero VAD may be used when noise is high.

Example Modulation and Training Phase Recognition

An embodiment may use modulation and training-phase recognition to classify modem or signaling phases.

In an embodiment, cyclostationary features and classical ML features may remain strong when a channel is messy. According to another embodiment, higher-order cyclic cumulants may be robust to unknown phase and timing offsets.

The following are non-limiting examples of deep learning models that may be used on in-phase (I)/quadrature (Q) data or spectrograms: CNNs, Convolutional, Long Short-Term Memory DNNs (CLDNNs), and attention-based hybrids trained on RadioML-style datasets are standard baselines. Such models may be used to identify or flag "FSK-like versus QAM-like," retrain events, or training failures.

An embodiment may generate synthetic training data that matches tones by leveraging liquid-dsp and GNU Radio open-source toolkits. This may allow for synthesizing FSK/PSK, adding controlled impairments, and exporting audio for a pipeline.

Example Prediction Models

The following are non-limiting examples of AI/ML prediction models according to an embodiment:

a) simple and calibrated: Logistic regression or gradient boosted trees may be used on engineered features (e.g., handshake timings, per-digit SNR/twist, ANS cadence statistics).

b) Add sequence context: a Temporal Convolutional Network (TCN), bi-directional gated recurrent unit (GRU)/Long Short-Term Memory (LSTM), or a small transformer encoder may be used over per-frame features.

c) hard cases: a 2D CNN may be used on short spectrogram windows around problem spots; its score may be ensembled with a feature model.

An embodiment may combine protocol-aware features with a compact neural model, then calibrate probabilities for a logic engine.

Example LLMs

An embodiment may run one or more LLMs (e.g., Llama 3.1 family and DeepSeek V2) locally for guidance, reports, and tool calling.

Example Method Embodiment

Figure 17:
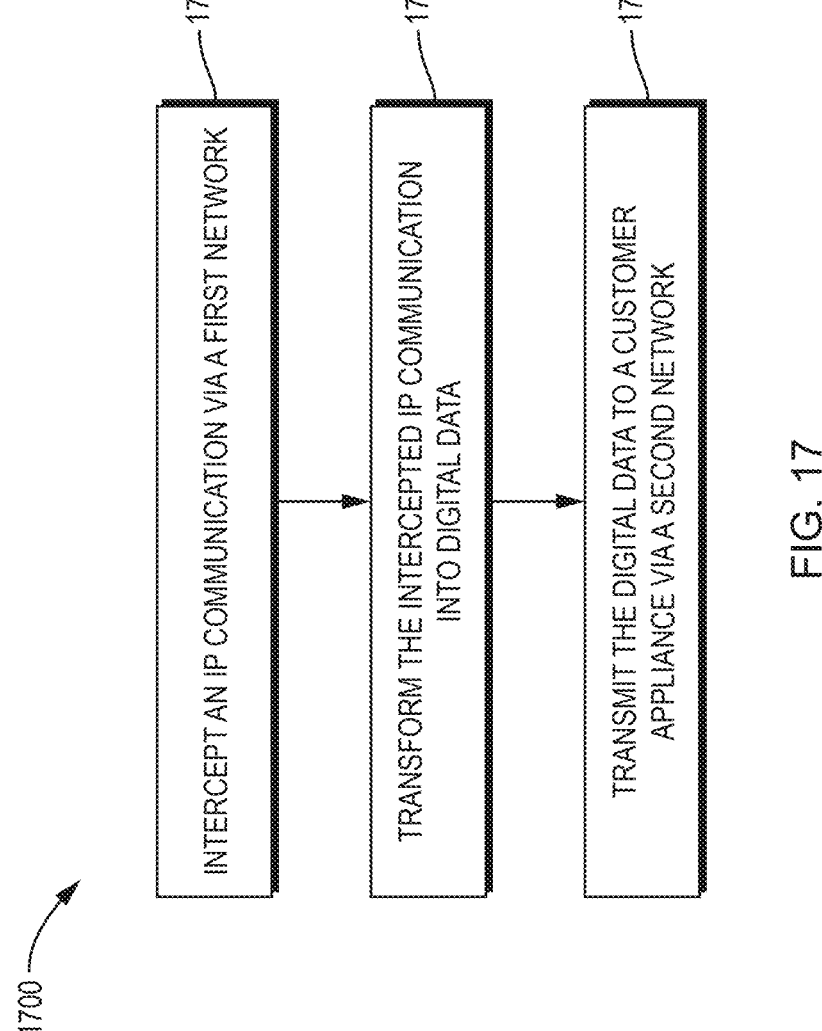
FIG. 17 is a flowchart of a method of virtual modem communications over IP according to an example embodiment.

FIG. 17 is a flowchart of a method 1700 of virtual modem communications over IP according to an embodiment. The method 1700 is computer-implemented and may be implemented using any computing device, e.g., a processor, or combination of computing devices known to those of skill in the art.

The method 1700 begins at step 1701 by intercepting an IP communication (e.g., 112 (FIG. 1)) via a first network (e.g., 108*b* (FIG. 1)). The IP communication is intended for a customer device (e.g., 102 (FIG. 1)). Next, at step 1702, the intercepted IP communication is transformed into digital data (e.g., 114 (FIG. 1)). At step 1703, the digital data is transmitted to a customer appliance (e.g., 104 (FIG. 1)) via a second network (e.g., 108*a* (FIG. 1)). The customer appliance is operably connected to the customer device. The customer appliance is configured to receive the digital data from the virtual modem via the second network and transmit the received digital data to the customer device as serial data (e.g., 116 (FIG. 1)).

As noted, the method 1700 is computer-implemented and, as such, the functionality and effective operations, e.g., the intercepting (1701), transforming (1702), and transmitting (1703), are automatically implemented by one or more digital processors. The method 1700 can also be implemented using any computer device or combination of computing devices known in the art. Among other examples, the method 1700 can be implemented using computer(s)/device(s) 50 and/or 60 described hereinbelow in relation to FIGS. 18 and 19.

Computer Support

Figure 18:
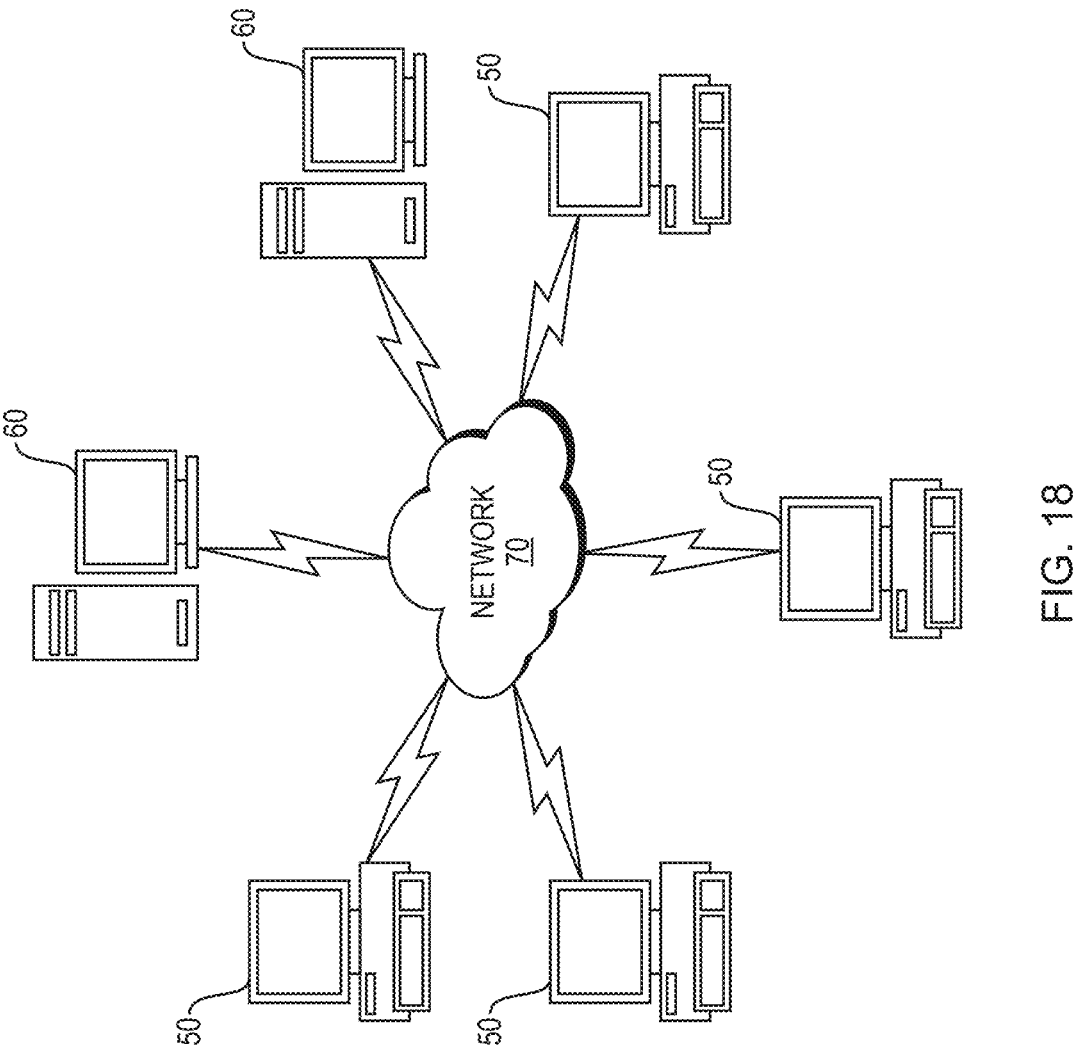
FIG. 18 is a schematic view of a computer network in which embodiments may be implemented.

FIG. 18 is a schematic view of a computer network in which embodiments may be implemented. Client computer(s)/devices 50 and server computer(s) 60 provide processing, storage, and input/output (I/O) devices executing application programs and the like. Client computer(s)/device(s) 50 can also be linked through communications network 70 to other computing devices, including other client device(s)/processor(s) 50 and server computer(s) 60. The communications network 70 can be part of a remote access network, a global network (e.g., the Internet), cloud computing servers or service, a worldwide collection of computers, local area or wide area networks, and gateways that currently use respective protocols (e.g., TCP/IP, Bluetooth®, etc.) to communicate with one another. Other electronic device/computer network architectures are also suitable.

Figure 19:
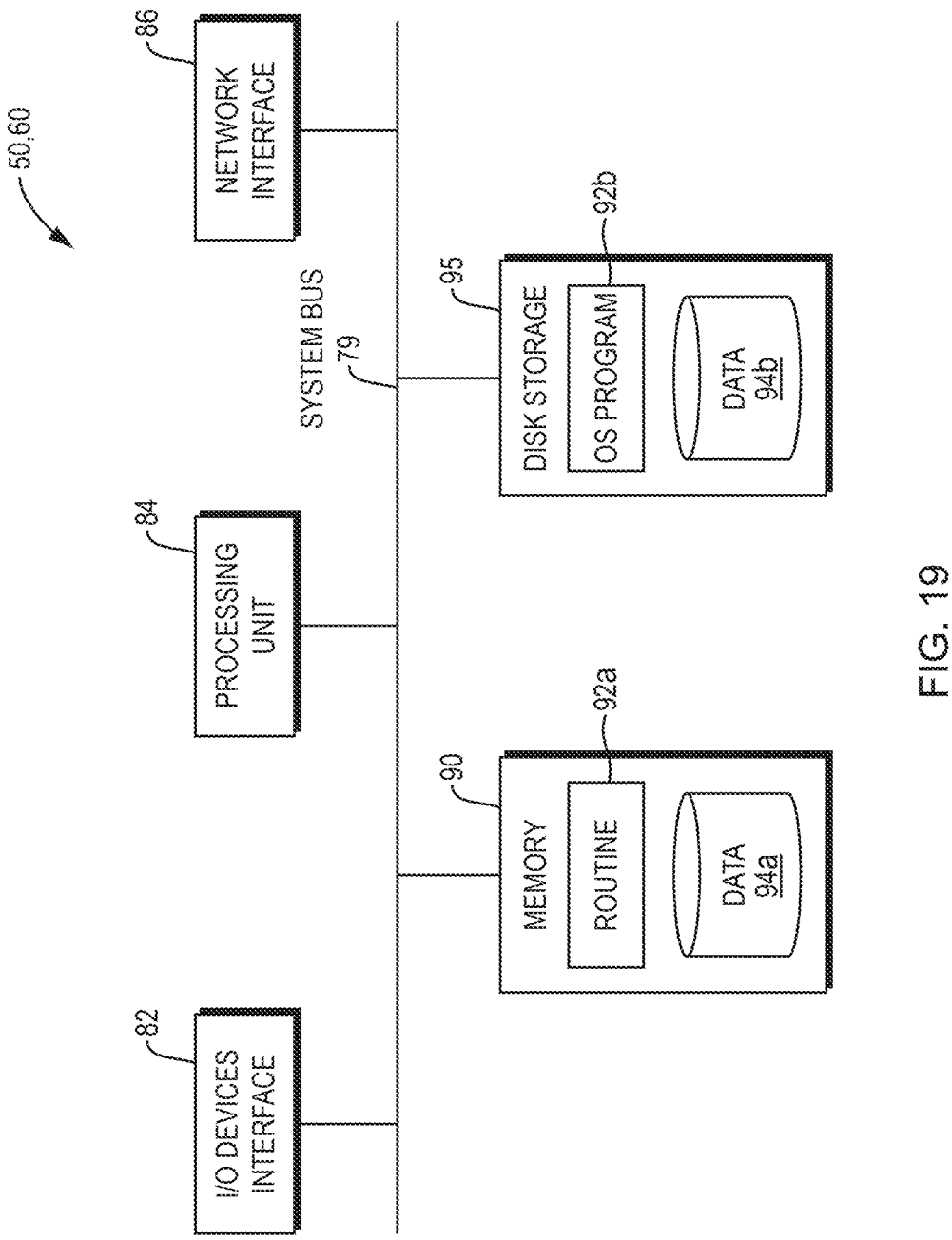
FIG. 19 is a block diagram illustrating an example embodiment of a computer node in the computer network of FIG. 18.

FIG. 19 is a block diagram illustrating an example embodiment of a computer node (e.g., client processor(s)/device(s) 50 or server computer(s) 60) in the computer network 70 of FIG. 18. Each computer node 50, 60 contains system bus 79, where a bus is a set of hardware lines used for data transfer among components of a computer or processing system. The system bus 79 is essentially a shared conduit that connects different elements of a computer system (e.g., processor, disk storage, memory, I/O ports, network ports, etc.) that enables transfer of information between the elements. Attached to the system bus 79 is an I/O devices interface 82 for connecting various input and output devices (e.g., keyboard, mouse, display(s), printer(s), speaker(s), etc.) to the computer node 50, 60. A network interface 86 allows the computer node to connect to various other devices attached to a network (e.g., the network 70 of FIG. 18). A memory 90 provides volatile storage for computer software instructions 92*a* and data 94*a* used to implement embodiments of the present disclosure (e.g., the system 100 of FIG. 1, the system 400 of FIG. 4, the system 500 of FIG. 5, the system 600 of FIG. 6, the system 700 of FIG. 7, the system 800 of FIG. 8, the system 900 of FIG. 9, the process 1100 of FIG. 11, the system 1200 of FIG. 12, the system 1300 of FIG. 13, the system 1400 of FIG. 14, the system 1500 of FIG. 15, the system 1600 of FIG. 16, the method 1700 of FIG. 17, etc.). A disk storage 95 provides non-volatile storage for the computer software instructions 92*b* and data 94*b* used to implement an embodiment of the present disclosure. A central processor unit (CPU) 84 is also attached to the system bus 79 and provides for execution of computer instructions.

In an embodiment, the processor routines 92*a*-92*b* and data 94*a*-94*b* are a computer program product (generally referenced as 92), including a non-transitory, computer readable medium (e.g., a removable storage medium such as DVD-ROM(s), CD-ROM(s), diskette(s), tape(s), etc.) that provides at least a portion of the software instructions for the disclosure system. The computer program product 92 can be installed by any suitable software installation procedure, as is well known in the art. In another embodiment, at least a portion of the software instructions may also be downloaded over a cable, communication, and/or wireless connection. In other embodiments, the disclosure programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present disclosure routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other networks (such as the network 70 of FIG. 18). In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of the computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium, and the like.

In other embodiments, the program product 92 may be implemented as a so-called Software as a Service (SaaS), or other installation or communication supporting end-users.

U.S. Pat. No. 10,986,555 B1 (hereinafter, "the '555 patent") and U.S. Pat. No. 11,743,797 B1 (hereinafter, "the '797 patent") are incorporated by reference in their entireties. Embodiments described herein may be implemented, in whole or in part, using embodiments described in the '555 and '797 patents.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for virtual modem communications over Internet Protocol (IP), the system comprising:

a customer appliance operably connected to a customer device; and a virtual modem in a data center, wherein the virtual modem communicates with the customer appliance via a first network and wherein the virtual modem is configured to:

intercept an IP communication via a second network, the IP communication intended for the customer device;

transform the intercepted IP communication into digital data; and transmit the digital data to the customer appliance via the first network;

wherein the customer appliance is configured to:

receive the digital data from the virtual modem via the first network; and transmit the received digital data to the customer device as serial data.

2. The system of claim 1, wherein the intercepted IP communication includes audio data generated by a modem device, and wherein the second network is (i) a Voice over IP (VoIP) network or (ii) a hybrid VoIP and public switched telephone network.

3. The system of claim 1, wherein the customer appliance is a first customer appliance, wherein the intercepted IP communication includes serial data generated by a second customer appliance, and wherein the second network is an IP network.

4. The system of claim 1, wherein the intercepted IP communication includes serial data generated by a virtual communications interface, and wherein the second network is an IP network.

5. The system of claim 1, further comprising:

a remote management console configured to:

receive an identifier corresponding to the customer device;

establish an out-of-band-management (OOBM) connection to the customer device based on the received identifier;

receive at least one OOBM command for the customer device; and transmit the at least one OOBM command received to the customer device;

wherein the intercepted IP communication includes the at least one OOBM command received.

6. The system of claim 5, wherein:

the first network is an IP network;

the remote management console includes a remote terminal interface;

the received identifier includes at least one of a network name or address of the customer device on the IP network; and the OOBM connection is a remote terminal protocol connection.

7. The system of claim 5, wherein:

the remote management console includes an online interface; and the received identifier is a selection of the customer device via the online interface.

8. The system of claim 7, wherein the remote management console is further configured to:

perform user authentication; and establish the OOBM connection, receive the at least one OOBM command, and transmit the at least one OOBM command responsive to an indication that the user authentication is successful.

9. The system of claim 5, wherein:

the remote management console includes a remote terminal interface;

the received identifier is a telephone number corresponding to the customer device; and the OOBM connection is a modem connection.

10. The system of claim 5, wherein:

the first network is an IP network;

the remote management console includes a remote terminal interface and a transcoded communications interface;

the received identifier includes at least one of a network name or address of the customer device on the IP network;

the OOBM connection is established via the transcoded communications interface; and the OOBM connection is a remote terminal protocol connection.

11. The system of claim 1, wherein the intercepted IP communication includes at least one of (i) analog data and (ii) metadata associated with a modem communication, and wherein the virtual modem is further configured to:

execute a machine learning (ML) model, the ML model configured to:

identify at least one application-layer pattern based on at least one of: (i) the analog data and (ii) the metadata; and determine a confidence score based on the at least one application-layer pattern identified, the confidence score associated with the modem communication.

12. The system of claim 11, wherein the ML model is further configured to, based on the at least one application-layer pattern identified, generate at least one status evaluation corresponding to at least one phase of the modem communication.

13. The system of claim 11, wherein the virtual modem is further configured to:

responsive to the confidence score being below a threshold:

perform one or more diagnostics of the modem communication; and generate a diagnostic report based on a result of the one or more diagnostics performed.

14. The system of claim 11, wherein the virtual modem is further configured to:

responsive to the confidence score being below a threshold:

based on at least one of: (i) the analog data and (ii) the metadata, generate reporting information for the modem communication; and store the generated reporting information in memory associated with the virtual modem.

15. The system of claim 11, wherein the modem communication is generated by a modem device operably connected to a remote device, and wherein the virtual modem is further configured to:

responsive to the confidence score being below a threshold:

based on the at least one application-layer pattern identified, generate at least one recommendation, wherein a given recommendation of the at least one recommendation relates to at least one of: (i) resolving an error associated with the modem device, (ii) resolving an error associated with the remote device, (iii) performing a maintenance operation on the modem device, and (iv) performing a maintenance operation on the remote device.

16. The system of claim 11, wherein the modem communication is generated by a modem device operably connected to a remote device, and wherein the virtual modem is further configured to:

responsive to the confidence score being below a threshold:

generate at least one user guidance item, a given user guidance item of the at least one user guidance item relating to performing an evaluation of at least one of: (i) the modem device and (ii) the remote device.

17. The system of claim 11, wherein the modem communication is generated by a modem device operably connected to a remote device, and wherein the virtual modem is further configured to:

responsive to the confidence score being below a threshold:

determine at least one updated parameter value for at least one of: the modem device and the remote device.

18. The system of claim 1, wherein:

the virtual modem is a first virtual modem;

the customer device includes a modem device; and the customer appliance includes a second virtual modem, wherein the second virtual modem is configured to:

receive analog data from the modem device;

transform the received analog data into serial data; and transmit the serial data to the first virtual modem via the first network.

19. A computer-implemented method of virtual modem communications over Internet Protocol (IP), the method comprising:

intercepting an IP communication via a first network, the IP communication intended for a customer device;

transforming the intercepted IP communication into digital data; and transmitting the digital data to a customer appliance via a second network, the customer appliance operably connected to the customer device and configured to:

receive the digital data from the virtual modem via the second network; and transmit the received digital data to the customer device as serial data.

\* \* \* \* \*